United States Patent
Grupiński et al.

(10) Patent No.: US 10,572,148 B2
(45) Date of Patent: Feb. 25, 2020

(54) ELECTRONIC DEVICE FOR DISPLAYING KEYPAD AND KEYPAD DISPLAYING METHOD THEREOF

(71) Applicant: Samsung Electronics Co., Ltd., Suwon-si, Gyeonggi-do (KR)

(72) Inventors: Andrzej Grupiński, Rokietnica (PL); Michael Łukasz Gajewski, Poznaé (PL); Tomasz Robert Gdala, Plewiska (PL); Natalia Paszkiewicz, Puszczykowo (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 765 days.

(21) Appl. No.: 15/094,381

(22) Filed: Apr. 8, 2016

(65) Prior Publication Data

US 2017/0003874 A1    Jan. 5, 2017

(30) Foreign Application Priority Data

Jul. 1, 2015    (KR) ........................ 10-2015-0094269

(51) Int. Cl.
*G06F 3/0488* (2013.01)
*G06F 1/16* (2006.01)
(Continued)

(52) U.S. Cl.
CPC ........ *G06F 3/04886* (2013.01); *G06F 1/1626* (2013.01); *G06F 1/1647* (2013.01);
(Continued)

(58) Field of Classification Search
CPC .. G06F 3/0482; G06F 3/0412; G06F 3/04845; G06F 3/04883; G06F 3/04886;
(Continued)

(56) References Cited

U.S. PATENT DOCUMENTS 8,593,405 B2 * 11/2013 Kuo .................... G06F 3/04886
 345/168
8,610,673 B2 * 12/2013 Storrusten ............. G06F 3/0425
 345/173

(Continued)

FOREIGN PATENT DOCUMENTS

WO    2011/087473 A1    7/2011

OTHER PUBLICATIONS

Surur; New Arc soft keyboard may be coming to Windows Phone 8; http://mspoweruser.corni; Jul. 2, 2012.
(Continued)

*Primary Examiner* — Matthew Ell
*Assistant Examiner* — Maria S Ayad
(74) *Attorney, Agent, or Firm* — Jefferson IP Law, LLP

(57) ABSTRACT

An electronic device and a display method thereof are provided. The electronic device includes a touch screen including a main display region positioned on a front surface of the electronic device and an auxiliary display region displaying a first keypad, a sensor configured to sense a first touch input for selecting at least one of user interaction (UI) elements included in the first keypad, and a controller configured to control the touch screen so that a character corresponding to the selected UI element is displayed in the main display region according to the touch input sensed by the sensor.

18 Claims, 36 Drawing Sheets

| CHARACTER 1 | CHARACTER 2 | WEIGHT |
|---|---|---|
| E | R | 91493 |
| A | N | 63563 |
| I | N | 63445 |
| O | N | 54597 |
| ⋮ | ⋮ | ⋮ |

(51) Int. Cl.
*G06F 3/041* (2006.01)
*G06F 3/0482* (2013.01)
*G06F 3/0484* (2013.01)

(52) U.S. Cl.
CPC .......... *G06F 3/0412* (2013.01); *G06F 3/0482* (2013.01); *G06F 3/04845* (2013.01); *G06F 3/04883* (2013.01); *G06F 2203/04102* (2013.01); *G06F 2203/04803* (2013.01)

(58) Field of Classification Search
CPC .. G06F 3/03547; G06F 3/0416; G06F 1/1626; G06F 1/1662; G06F 3/0216; G06F 1/1647; G06F 2203/04803; G06F 2203/04102
USPC .................................. 345/173, 168; 715/773
See application file for complete search history.

(56) References Cited

U.S. PATENT DOCUMENTS

| | | | | |
|---|---|---|---|---|
| 8,806,362 | B2* | 8/2014 | Ording | G06F 3/0236 345/168 |
| 9,035,888 | B1 | 5/2015 | Delatorre | |
| 2004/0136564 | A1* | 7/2004 | Roeber | G06F 3/0488 382/100 |
| 2008/0082934 | A1* | 4/2008 | Kocienda | G06F 3/04883 715/773 |
| 2013/0002575 | A1* | 1/2013 | Endo | G06F 3/0236 345/173 |
| 2013/0097548 | A1* | 4/2013 | Yang | G06F 3/0238 715/773 |
| 2013/0300697 | A1* | 11/2013 | Kim | G06F 1/1626 345/173 |
| 2014/0098024 | A1* | 4/2014 | Paek | G06F 3/04886 345/168 |
| 2014/0118271 | A1* | 5/2014 | Lee | G06F 3/0488 345/173 |
| 2014/0237356 | A1* | 8/2014 | Durga | G06F 17/276 715/256 |
| 2014/0250405 | A1* | 9/2014 | Wheeler | G06F 3/0482 715/780 |
| 2014/0267091 | A1 | 9/2014 | Kim | |
| 2014/0282211 | A1* | 9/2014 | Ady | G06F 3/0484 715/780 |
| 2014/0331160 | A1* | 11/2014 | Lowiec | G06F 3/0233 715/769 |
| 2015/0015511 | A1 | 1/2015 | Kwak et al. | |
| 2018/0285335 | A1* | 10/2018 | Xu | G06F 3/0236 |

OTHER PUBLICATIONS

Comfort Software; On-Screen Keyboard for Windows, version 7.4.1.0; http://www.comfort-software.com/on-screen-keyboard.html; Mar. 10, 2016.

AI.Type; Ai.type designs and develops the most personalized keyboard for mobile phones and tablets; http://aitype.com/; site accessed Mar. 29, 2016.

Swype; Type Fast, Swype Faster; http://www.swype.com/; site accessed Mar. 29, 2016.

* cited by examiner

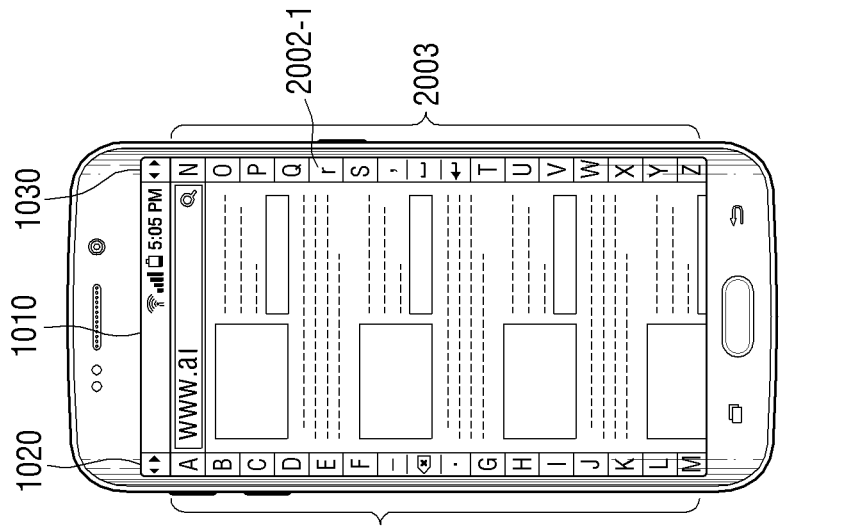
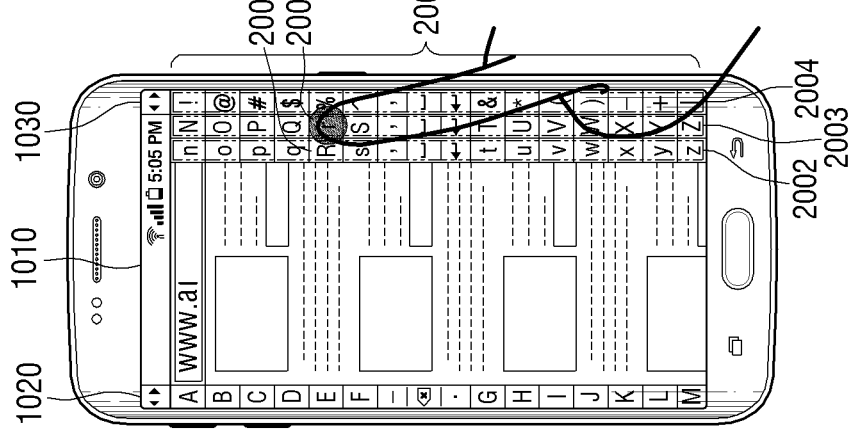
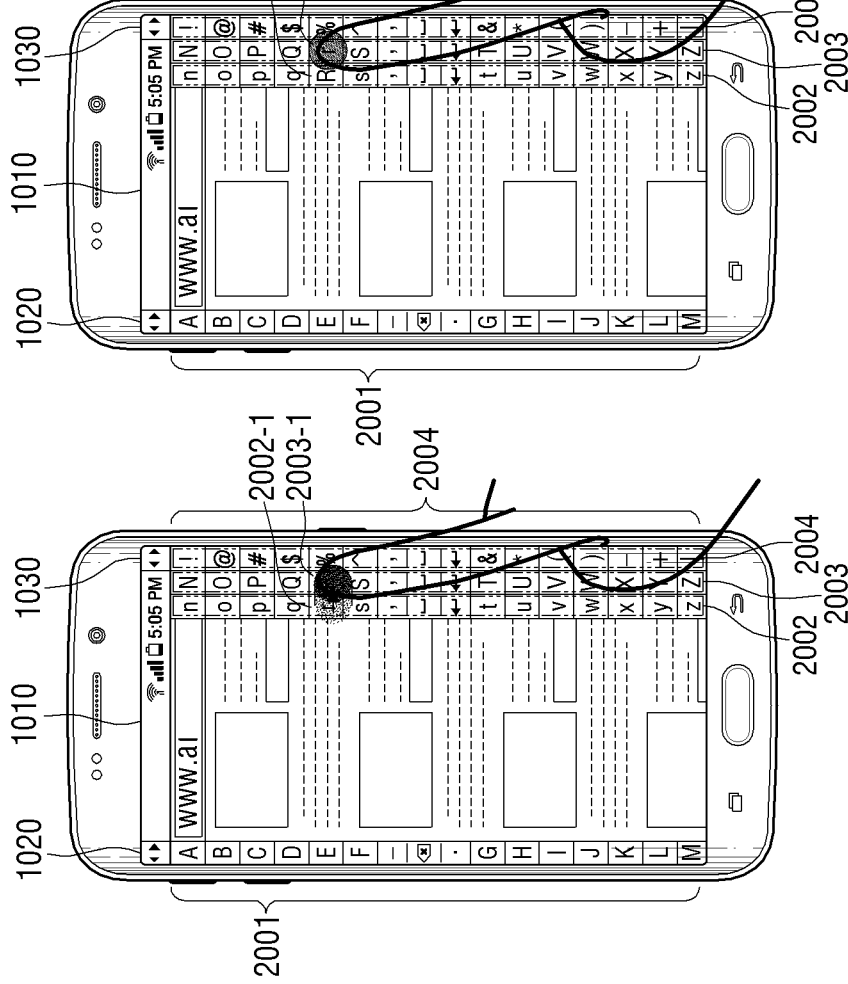

FIG. 26A
| CHARACTER 1 | CHARACTER 2 | WEIGHT |
|---|---|---|
| E | R | 91493 |
| A | N | 63563 |
| I | N | 63445 |
| O | N | 54597 |
| ⋮ | ⋮ | ⋮ |
FIG. 26B
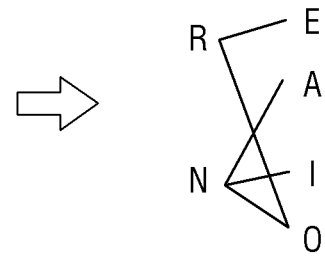
FIG. 26C
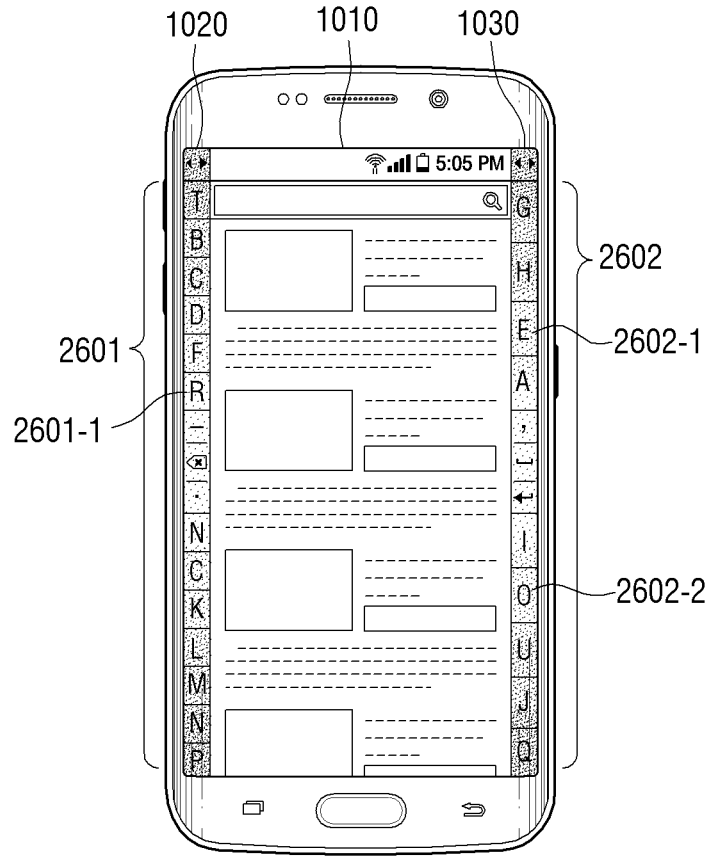

ELECTRONIC DEVICE FOR DISPLAYING KEYPAD AND KEYPAD DISPLAYING METHOD THEREOF

CROSS-REFERENCE TO RELATED APPLICATION(S)

This application claims the benefit under 35 U.S.C. § 119(a) of a Korean patent application filed on Jul. 1, 2015 in the Korean Intellectual Property Office and assigned Serial No. 10-2015-0094269, the entire disclosure of which is hereby incorporated by reference.

TECHNICAL FIELD

The present disclosure relates to an electronic device for displaying a keypad and a keypad displaying method thereof. More particularly, the present disclosure relates to an electronic device for displaying a keypad in an auxiliary display region and a keypad displaying method thereof.

BACKGROUND

With the development of electronic technologies, various types of electronic devices have been developed and propagated. Recently, an electronic device has more diverse functions while having a minimized size, and as a result, a demand for the electronic device is increasing.

The electronic device may provide various contents, such as multimedia contents and an application screen, in response to a user's request. A user may use buttons, a touch screen, and the like which are installed in the electronic device to select functions which he/she wants to use. Further, the electronic device may optionally execute programs depending on an interaction with the user and display the executed results.

As functions that are provided by the electronic device continue to diversify, various needs for a method for displaying contents or a user interaction method have been generated. That is, as a kind and a function of contents are more diverse, the existing interaction method, which simply selects a button or touches a touch screen on a front surface of the electronic device, may be insufficient.

Therefore, a need for a user interaction technology to enable the user to use the electronic device more conveniently has emerged.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device capable of supporting various user interactions using a keypad displayed in an auxiliary display region and a control method thereof.

Another aspect of the present disclosure is to provide an electronic device capable of supporting various user interactions using a keypad displayed in an auxiliary display region having a size smaller than a main display region positioned on a side surface of the main display region and a control method thereof.

According to various embodiments of the present disclosure, the electronic device may provide various user experiences using the keypad displayed in the auxiliary display region. As a result, it is possible to enhance the user convenience and satisfaction.

In accordance with an aspect of the present disclosure, a display method of an electronic device including a touch screen including a main display region and a first curved auxiliary display region curved toward a first side of the main display region while integrally extending from the main display region and having a size smaller than that of the main display region is provided. The display method includes displaying a character input field in the main display region, displaying a first keypad including user interaction (UI) elements corresponding to a plurality of characters, respectively, in the first curved auxiliary display region, in a state in which the character input field is displayed, and, when a touch input for selecting one UI element from the UI elements included in the first keypad is sensed, displaying the character corresponding to the selected one UI element in the character input field.

The UI elements included in the first keypad may be arranged in a vertical direction of the electronic device according to a predetermined sequence.

The first keypad may further include the UI element indicating a position at which the character is displayed or deleting a pre-written character.

The display method may further include displaying a second keypad including the UI elements corresponding to the plurality of characters, respectively, in a second curved auxiliary display region curved toward a second side of the main display region while integrally extending from the main display region and having a size smaller than that of the main display region, in which the characters corresponding to the UI elements included in the first keypad and the characters corresponding to the UI elements included in the second keypad may be different from each other.

The display method may further include, when a touch input for controlling sizes of the UI elements included in the first keypad is sensed, displaying the first keypad including the UI elements whose sizes are controlled in the first curved auxiliary display region.

The display method may further include, when a touch input for moving positions of the UI elements included in the first keypad is sensed, displaying the first keypad including the UI elements whose positions move in the first curved auxiliary display region.

The display method may further include, when a touch input for displaying other keypads is sensed, displaying a second keypad in the first curved auxiliary display region, in which the characters corresponding to the UI elements included in the first keypad and the characters corresponding to the UI elements included in the second keypad may be different from each other.

The display method may further include, when the touch input for selecting the one UI element from the UI elements included in the first keypad is sensed, displaying a second keypad including UI elements corresponding to other characters associated with the character corresponding to the selected one UI element in a second curved auxiliary display region curved toward a second side of the main display region while integrally extending from the main display region and having a size smaller than that of the main display region.

The display method may further include, when a touch input for displaying other UI elements in the first keypad is sensed, removing at least some of the UI elements included in the first keypad and displaying other UI elements while being included in the first keypad.

In accordance with another aspect of the present disclosure, a display method of an electronic device including a touch screen including a main display region, a first auxiliary display region integrally extending from the main display region, positioned at a first side of the main display region, and having a size smaller than that of the main display region, and a second auxiliary display region integrally extending from the main display region, positioned at a second side of the main display region, and having a size smaller than that of the main display region is provided. The display method includes displaying a character input field in the main display region, displaying a first keypad including UI elements corresponding to first characters, respectively, in the first auxiliary display region and displaying a second keypad including the UI elements corresponding to second characters, respectively, in the second auxiliary display region, in a state in which the character input field is displayed, and when a touch input for selecting the UI elements corresponding to each of the first characters and one UI element selected from the UI elements corresponding to each of the second characters is sensed, displaying a character corresponding to the selected on element in the character input field.

In accordance with another aspect of the present disclosure, an electronic device is provided. The electronic device includes a touch screen including a main display region and a first curved auxiliary display region curved toward a first side of the main display region while integrally extending from the main display region and having a size smaller than that of the main display region, a touch screen configured to display a character input field in the main display region and displaying a first keypad including UI elements corresponding to a plurality of characters, respectively, in the first curved auxiliary display region, a sensor configured to sense a first touch input for selecting one UI element from UI elements included in the first keypad, and a controller configured to control the touch screen so that a character corresponding to the selected one UI element is displayed in the character input field, depending on the first touch input sensed by the sensor.

The UI elements included in the first keypad may be arranged in a vertical direction of the electronic device according to a predetermined sequence.

The first keypad may further include a UI element configured to indicate a position where a character is displayed or delete a pre-written character. The touch screen may further include a second curved auxiliary display region curved toward a second side of the main display region while integrally extending from the main display region and having a size smaller than that of the main display region configured to display a second keypad including the UI elements corresponding to the plurality of characters, respectively, in the second curved auxiliary display region, the characters corresponding to the UI elements included in the first keypad and the characters corresponding to the UI elements included in the second keypad may be different from each other.

The sensor may be further configured to sense a second touch input for controlling sizes of the UI elements included in the first keypad, and the controller may be further configured to control the touch screen so that the first keypad including the UI elements whose sizes are controlled is displayed in the first curved auxiliary display region, depending on the touch input sensed by the sensor.

The sensor may be further configured to sense a second touch input for moving positions of the UI elements included in the first keypad and the controller may be further configured to control the touch screen so that the first keypad including the UI elements whose positions move is displayed in the first curved auxiliary display region, depending on the second touch input sensed by the sensor.

The sensor may be further configured to sense a second touch input for displaying other keypads, the controller may be further configured to control the touch screen so that the second keypad is displayed in the first curved auxiliary display region, depending on the second touch input sensed by the sensor, and the characters corresponding to the UI elements included in the first keypad and the characters corresponding to the UI elements included in the second keypad may be different from each other.

The touch screen may further include a second curved auxiliary display region curved toward a second side of the main display region while integrally extending from the main display region and having a size smaller than that of the main display region, the sensor may be further configured to sense a second touch input for selecting one UI element from UI elements included in the first keypad, and the controller may be further configured to control the touch screen so that the second keypad including the UI elements corresponding to other characters associated with the character corresponding to the selected one UI element is displayed in the second curved auxiliary display region, depending on the second touch input sensed by the sensor.

The sensor may be further configured to sense a second touch input for displaying other UI elements in the first keypad, and the controller may be further configured to control the touch screen so that at least some of the UI elements included in the first keypad are removed and other UI elements are displayed while being included in the first keypad, depending on the second touch input sensed by the sensor.

In accordance with another aspect of the present disclosure, an electronic device is provided. The electronic device includes a touch screen including a main display region, a first auxiliary display region integrally extending from the main display region, positioned at a first side of the main display region, and having a size smaller than that of the main display region, and a second auxiliary display region integrally extending from the main display region, positioned at a second side of the main display region, and having a size smaller than that of the main display region is provided. The electronic device includes a touch screen configured to display a character input field in the main display region, a first keypad including UI elements corresponding to first characters, respectively, in the first auxiliary display region and a second keypad including the UI elements corresponding to second characters, respectively, in the second auxiliary display region, a sensor configured to sense a touch input for selecting one UI element from the UI elements included in the first keypad, and a controller configured to control the touch screen so that a character corresponding to the selected UI element is displayed in the main display region, depending on the first touch input sensed by the sensor.

According to the above described various exemplary embodiments, an electronic apparatus may provide various user experiences using a key pad displayed on an auxiliary display area. Accordingly, user convenience and user satisfaction can be enhanced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWING FIGURES

The above and other aspects, features, and advantages of certain embodiments of the present disclosure will be more apparent from the following description taken in conjunction with reference to the accompanying drawings, in which.

Figure 1:
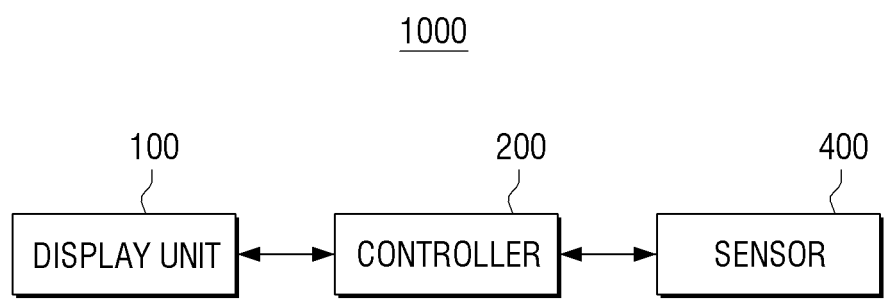
FIG. 1 is a block diagram illustrating an example of a basic configuration of an electronic device according to various embodiments of the present disclosure.

FIGS. 12A to 30B are diagrams illustrating an electronic device for displaying a keypad in an auxiliary display region and a user interaction using the same, according to various embodiments of the present disclosure; and FIGS. 31 to 35 are flowcharts for describing a user interaction using a keypad displayed in an auxiliary display region according to various embodiments of the present disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of the well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms such as 'first', 'second', and the like, may be used to describe various components, but the components are not to be construed as being limited by the terms. The terms are used to distinguish one component from another component.

Terms used in the present specification are used only in order to describe various embodiments and should not be construed as limiting the scope of the present disclosure. Singular forms are intended to include plural forms unless the context clearly indicates otherwise. It will be further understood that the terms "comprises" or "have," as used in this specification, specify the presence of stated features, numerals, steps, operations, components, parts mentioned in this specification, or a combination thereof, but do not preclude the presence or addition of one or more other features, numerals, steps, operations, components, parts, or a combination thereof.

In various embodiments of the present disclosure, a 'module' or a 'unit' performs at least one function or operation and may be implemented by hardware or software or a combination of the hardware and the software. Further, a plurality of 'modules' or a plurality of 'units' are integrated into at least one module except for the 'module' or 'unit' which needs to be implemented by specific hardware and thus may be implemented by at least one processor (not illustrated).

In various embodiments of the present disclosure, a case in which any one part is connected with the other part includes a case in which the parts are "directly connected" with each other and a case in which the parts are "electrically connected" with each other with other elements interposed therebetween. In addition, unless explicitly described to the contrary, "comprising" any components will be understood to imply the inclusion of other elements rather than the exclusion of any other elements.

In various embodiments of the present disclosure, a user interaction may include a user's input using at least one of a touch input, a bending input, a speech input, a button input, a motion input, and a multimodal input, but is not limited thereto.

In various embodiments of the present disclosure, the "touch input" may include a touch gesture performed on a display and a cover for a user to control devices. Further, the "touch input" may include a touch (for example, floating or hovering) in a state in which the touch is spaced apart from the display over a predetermined distance without being touched on the display. The touch input may include a touch & hold gesture, a tap gesture released after being touched, a double tap gesture, a panning gesture, a flick gesture, a touch drag gesture moving in one direction after being touched, a pinch gesture, etc., but is not limited thereto.

In various embodiments of the present disclosure, the "button input" means an input for a user to control a device using a physical button attached to the device.

In various embodiments of the present disclosure, the "motion input" means a motion applied to a device for a user to control the device. For example, the motion input may include an input for a user to rotate a device, tilt the device, or move the device in all directions.

In various embodiments of the present disclosure, the "multimodal input" means that at least two input schemes are combined with each other. For example, the device may also receive the user's touch input and motion input and the user's touch input and speech input.

In various embodiments of the present disclosure, "application" means a set of a series of computer programs devised to perform specific jobs. In various embodiments of the present disclosure, the application may be diverse. For example, the application may include game application, moving picture playing application, map application, memo application, calendar application, phone book application, broadcasting application, exercise support application, settlement application, picture folder application, web application, etc., but is not limited thereto.

In various embodiments of the present disclosure, "application identification information" may be unique information for distinguishing the application from other applications. For example, the application identification information may include an icon, an index item, link information, etc., but is not limited thereto.

In various embodiments of the present disclosure, a user interaction (UI) element means an element which may implement interaction with a user to perform visual, audible, tactile, olfactory feedbacks, etc., depending on the user's input.

In various embodiments of the present disclosure, a keypad means a virtual keypad which is displayed in a display region of an electronic device to implement interaction with the user through the touch input. The keypad may include a plurality of UI elements corresponding to a plurality of characters, respectively. If the user selects one UI element from the UI elements included in the keypad, the electronic device may perform functions associated with characters corresponding to the selected UI element. For example, the electronic device may display the character corresponding to the selected UI element in a character input field.

Hereinafter, embodiments of the present disclosure will be described with reference to the accompanying drawings.

FIG. 1 is a block diagram illustrating an example of a basic configuration of an electronic device for describing various embodiments of the present disclosure.

Referring to FIG. 1, an electronic device 1000 may include a display unit 100, a sensor 400, and a controller 200. The electronic device 1000 of FIG. 1 may be implemented as various types of devices such as television (TV), a personal computer (PC), a laptop PC, a cellular phone, a tablet PC, a personal digital assistant (PDA), an Moving Picture Experts Group phase 1 or phase 2 (MPEG-1 or MPEG-2) audio layer 3 (MP3) player, a kiosk, a digital photo frame, and a table display device. When the electronic device 1000 is implemented as a portable type of device such as the cellular phone, the tablet PC, the PDA, the MP3 player, and the laptop PC, it may also be called a mobile device but will be collectively called an electronic device in the present specification.

The display unit 100 provides a display region in which multimedia contents or an application screen is displayed. Here, the display region may be divided into a main display region and at least one auxiliary display region. Here, the main display region and the auxiliary display region may be defined as various meanings. For example, a region having a relatively larger size of the two regions may be defined as the main display region and a region having a relatively smaller size of the two regions may be defined as the auxiliary display region. Alternatively, a region positioned on the same surface as a surface on which a home button for returning to a home screen, a front speaker, or the like is disposed may be defined as the main display region and a region positioned at a side surface may be defined as the auxiliary display region. Alternatively, the main display region may be defined as a region capable of directly controlling UIs within the region and the auxiliary display region may also be defined as a region capable of controlling UIs within the main display region. Alternatively, a region positioned on the front surface of the electronic device 1000 may be defined as the main display region and a region curved from one side of the main display region while integrally extending from the main display region may also be defined as the auxiliary display region.

In this case, an area of the auxiliary display region may be smaller than that of the main display region. Further, the plurality of auxiliary display regions may form a surface different from the main display region. For example, if the main display region is disposed on the front surface of the electronic device 1000, at least one auxiliary display region may be disposed on different surfaces such as a right side surface, a left side surface, an upper side surface, and a lower side surface among surfaces forming an appearance of the electronic device 1000. The surface including the main display region and the surface including at least one auxiliary display region may be fixed to form an obtuse angle. The forms, positions, and number of auxiliary display regions may be variously implemented depending on the various embodiments of the present disclosure. This will be described below in more detail with reference to the accompanying drawings. Meanwhile, when the auxiliary display region is positioned on the side surface among the surfaces forming the appearance of the electronic device 1000, the auxiliary display region may be defined as an edge region.

The sensor 400 may sense the touch input of the user on the display region. In more detail, the sensor 400 may use a touch panel to output a touch event value corresponding to the touch input of the user.

The controller 200 may use the main display region and the plurality of auxiliary display regions of the display unit 100 to control a general function of the electronic device 1000.

In more detail, if the touch input of the user selecting one UI element from the UI elements included in the keypad which is displaying in the auxiliary display region is sensed, the controller 200 may control the display unit 100 to display a character corresponding to the UI element in the main display region.

Figure 2:
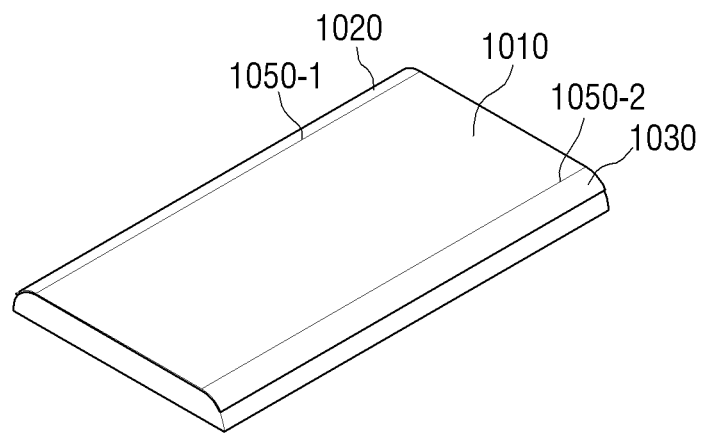
FIGS. 2 to 10 are diagrams illustrating examples of an appearance configuration of an electronic device and an example of a cross section configuration thereof according to various embodiments of the present disclosure.
Figure 3:
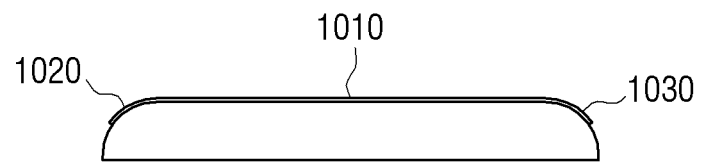

FIGS. 2 and 3 are diagrams illustrating an example of an appearance configuration of an electronic device including a display unit divided into a main display region and two auxiliary display regions and an example of a cross section configuration thereof.

Referring to FIG. 2, a main display region 1010 is disposed on the front surface and the auxiliary display regions 1020 and 1030 are disposed on the left side surface and the right side surface, respectively. The main display region 1010 and each of the auxiliary display regions 1020 and 1030 are divided by boundary regions 1050-1 and 1050-2. In this case, considering the fact that the display unit 100 is in a bent state, the boundary regions 1050-1 and 1050-2 may be differently represented as a bending line. In this case, the boundary regions 1050-1 and 1050-2 may be disposed at a boundary between the front surface and the side surface of the electronic device 1000 but may be disposed on the front surface close to the side surface of the electronic device 1000 according to the implementation method. That is, one of the auxiliary display regions 1020 and 1030 may be disposed on the front surface of the electronic device 1000 and the other thereof may be disposed on the side surface of the electronic device 1000.

FIG. 3 illustrates a cross section configuration of the electronic device of FIG. 2.

Referring to FIG. 3, each of the auxiliary display regions 1020 and 1030 may be disposed to form an obtuse angle to the main display region 1010 to be able to be viewed from a front direction. That is, as illustrated in FIG. 3, each of the auxiliary display regions 1020 and 1030 may be bent as if it encloses only a portion of the left side surface and the right side surface of the electronic device 1000.

Figure 4:
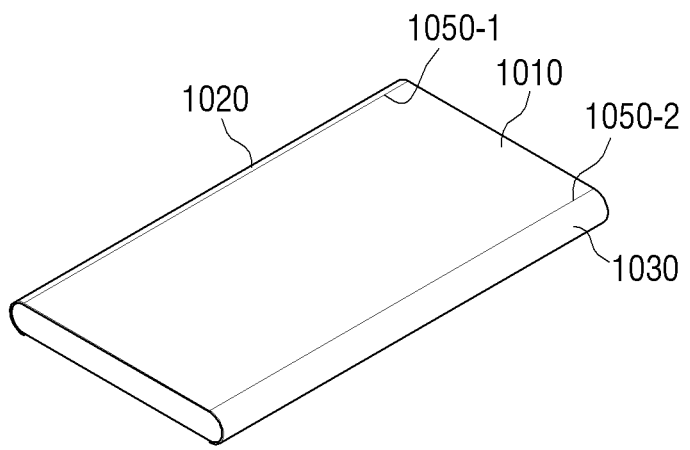
Figure 5:
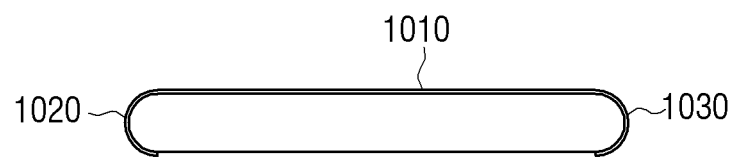

FIGS. 4 and 5 are diagrams illustrating an example of an appearance configuration of an electronic device including a display unit divided into a main display region and two auxiliary display regions and another example of a cross section configuration thereof.

Referring to FIG. 4, two auxiliary display regions 1020 and 1030 are disposed at both side surfaces based on a main display region 1010 and may be fixed at an angle at which they may be viewed from the right and left directions, not from the front direction. In this case, the main display region 1010 and each of the auxiliary display regions 1020 and 1030 are divided by boundary regions 1050-1 and 1050-2.

FIG. 5 illustrates a cross section configuration of the electronic device of FIG. 4.

Referring to FIG. 5, each of the auxiliary display regions 1020 and 1030 may be bent approximately at 90° with respect to a surface including the main display region 1010. That is, as illustrated in FIG. 5, each of the auxiliary display regions 1020 and 1030 may be bent as if it encloses the whole of the left side surface and the right side surface of the electronic device 1000.

Figure 6:
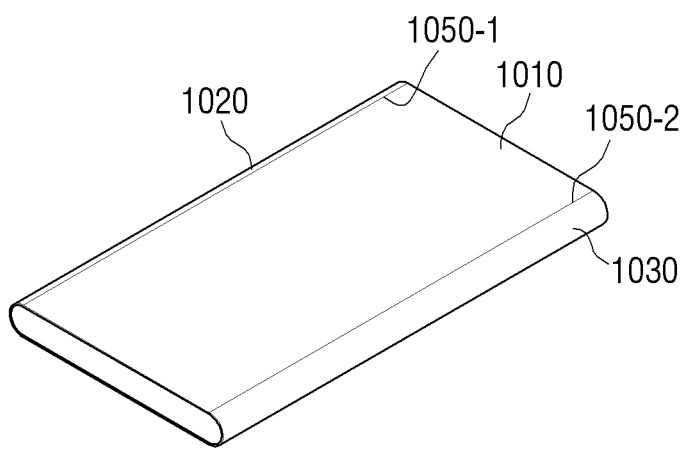
Figure 7:
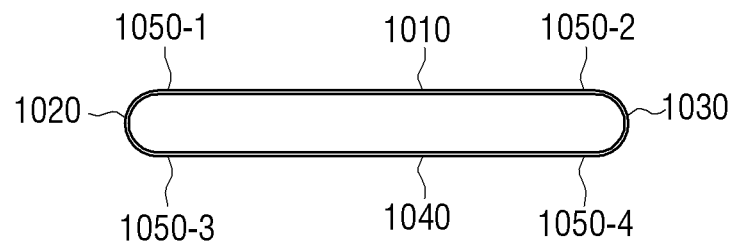

FIGS. 6 and 7 are diagrams illustrating an example of an appearance configuration of an electronic device including a display unit divided into a main display region and three auxiliary display regions and another example of a cross section configuration thereof.

Referring to FIGS. 6 and 7, two auxiliary display regions 1020 and 1030 may be disposed at both side surfaces based on a main display region 1010 and one auxiliary display region 1040 may be disposed on a rear surface of the main display region 1010. The main display region 1010 and the two auxiliary display regions 1020 and 1030 may be divided by boundary regions 1050-1 and 1050-2 and the auxiliary display region 1040 and the two auxiliary display regions 1020 and 1030 which are disposed on the rear surface may be divided by boundary regions 1050-3 and 1050-4.

FIG. 7 illustrates a cross section configuration of the electronic device of FIG. 6.

Referring to FIG. 7, the three auxiliary display regions 1020, 1030, and 1040 may be bent to enclose all of the left side surface, the right side surface, and the rear surface of the electronic device 1000.

Meanwhile, the electronic device 1000 may have a triangular cross section. In this case, the surface including the main display region and the surface including the auxiliary display region are connected to each other to form an obtuse angle θ at the boundary region. In addition, the cross section configuration may be configured in various shapes such as a trapezoid and a polygon.

Further, a state in which the display unit 100 is horizontally bent based on the front surface of the electronic device 1000 is illustrated as described above, but the present disclosure is not limited thereto. That is, the display unit 100 may be vertically bent based on the front surface of the electronic device 1000.

Figure 8:
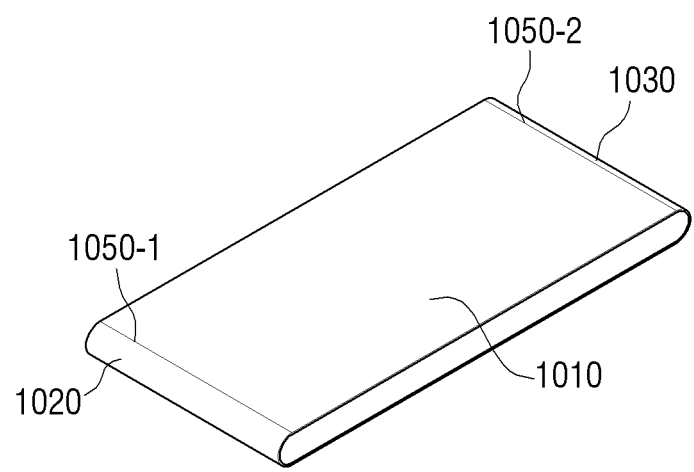

FIG. 8 illustrates a state in which a display unit is bent vertically.

Referring to FIG. 8, a display unit 100 may be divided into a main display region 1010 disposed on the front surface of an electronic device 1000 and auxiliary display regions 1020 and 1030 disposed on each of the upper surface and the lower surface thereof. In this case, the main display region 1010 and the auxiliary display regions 1020 and 1030 disposed on the upper surface and the lower surface may be divided by boundary regions 1050-1 and 1050-2.

Figure 9:
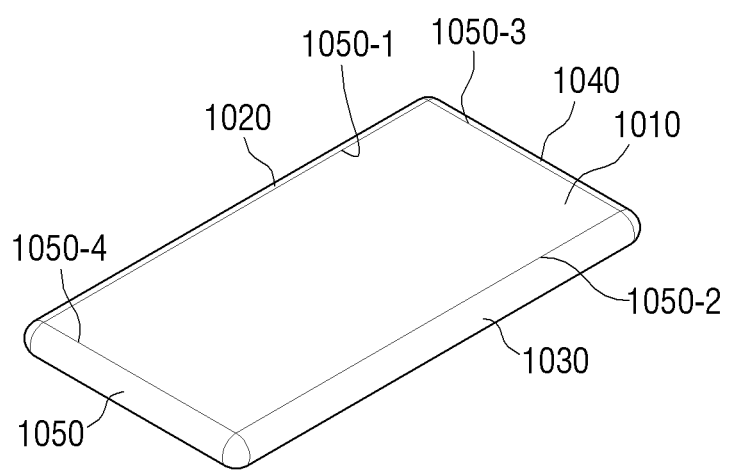

Further, FIGS. 2 to 8 illustrate that the auxiliary display regions are present only the two side surfaces, which is only an embodiment of the present disclosure, and therefore the auxiliary display region may be present on at least three side surfaces. For example, as illustrated in FIG. 9, a display unit 100 may include a main display region 1010 and four auxiliary display regions 1020, 1030, 1040, and 1050. In this case, the main display region 1010 and the auxiliary display regions 1020, 1030, 1040, and 1050 disposed on four surfaces may be divided by boundary regions 1050-1, 1050-2, 1050-3, and 1050-4.

Figure 10:
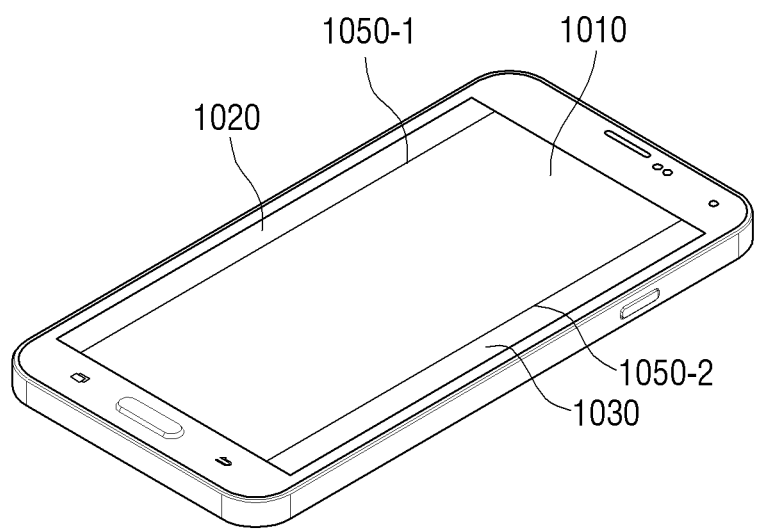

Meanwhile, FIGS. 2 to 9 illustrate that a surface including a main display region 1010 while auxiliary display regions 1020 and 1030 are configured in a curved shape which is a round shape and the curved surface including the auxiliary display regions 1020 and 1030 are connected to each other to form an obtuse angle θ, but as illustrated in FIG. 10, the auxiliary display regions 1020 and 1030 may be configured in a plane shape and thus the surface including the main display region 1010 and the surface including the auxiliary display regions 1020 and 1030 may be positioned on the same plane. In this case, the plane including the main display region 1010 and the plane including the auxiliary display regions 1020 and 1030 may contact each other along boundary regions 1050-1 and 1050-2.

In the present disclosure, the auxiliary display region configured in the curved shape which is the round shape is referred to as a curved auxiliary display region and the auxiliary display region configured in the plane form is referred to as a plane auxiliary display region. Further, both of the curved auxiliary display region and the auxiliary display region are defined as the auxiliary display region.

FIG. 1 illustrates a configuration of an electronic device including the display unit 100, the sensor 400, and the controller 200, but according to various embodiments of the present disclosure, the electronic device 1000 may include additional components. For example, the electronic device 1000 may further include a memory in which various applications are stored. The controller 200 may execute applications stored in the memory depending on a user gesture to display contents provided by the applications in at least one of the main display region and the auxiliary display region. In other words, the controller 200 may control the display unit 100 to display the contents provided by the applications in the main display region and at least one of the plurality of auxiliary display regions.

In addition, the electronic device 1000 may be configured in various forms.

Figure 11A:
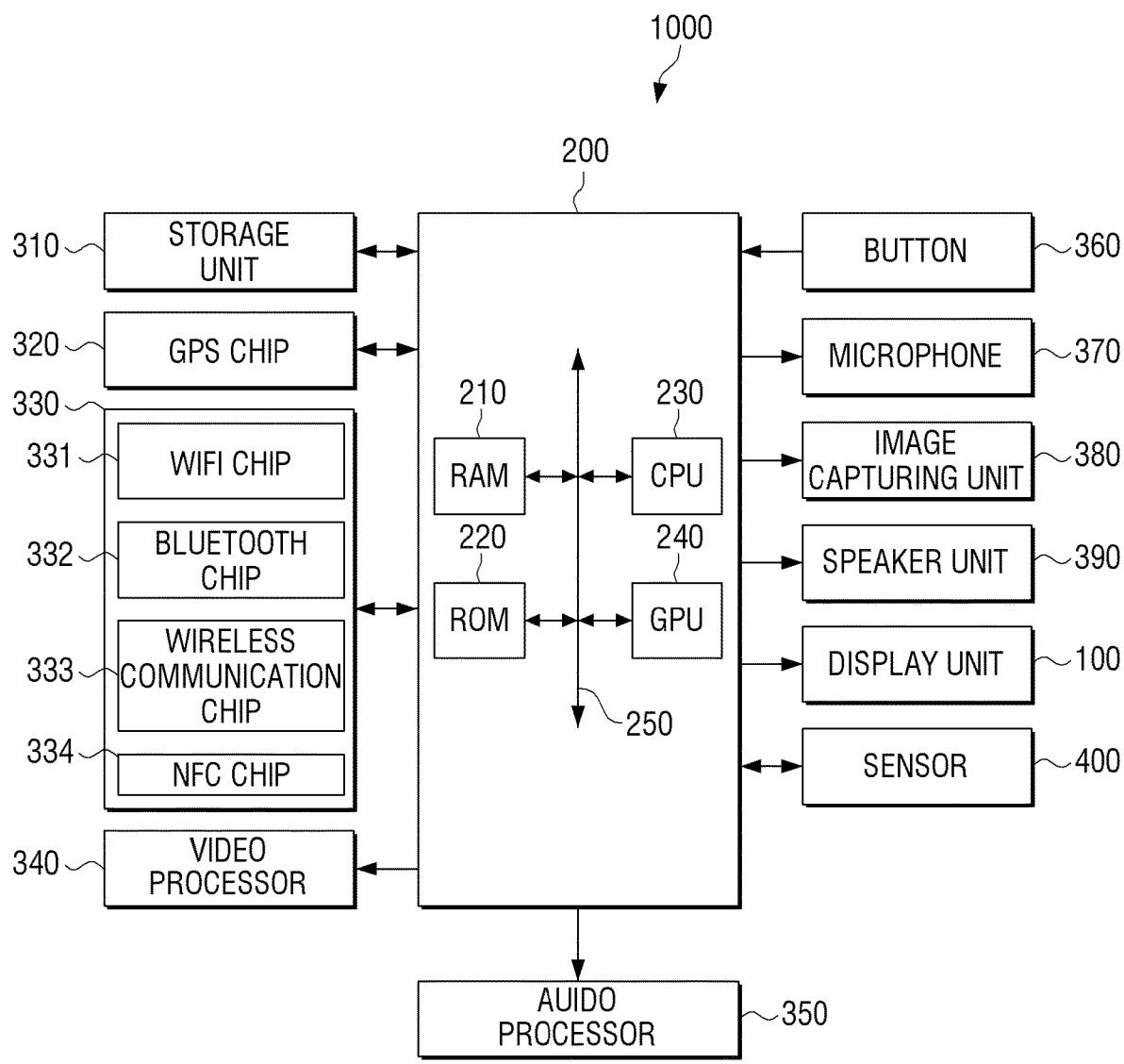
FIG. 11A is a block diagram illustrating a configuration of an electronic device according to various embodiments of the present disclosure.

FIG. 11A is a block diagram illustrating a configuration of an electronic device according to various embodiments of the present disclosure.

Referring to FIG. 11A, the electronic device 1000 includes a display unit 100, a controller 200, a storage unit 310, a GPS chip 320, a communication unit 330, a video processor 340, an audio processor 350, a button 360, a microphone 370, an image capturing unit 380, a speaker unit 390, and the sensor 400.

As described above, the display unit 100 may provide the main display region and at least one auxiliary display region. The display unit 100 may be implemented as various forms of displays such as a liquid crystal display (LCD), an organic light emitting diode (OLED) display, and a plasma, display panel (PDP). A driving circuit which may be implemented in forms of an a-si thin-film-transistor (TFT), a low temperature poly silicon (LTPS) TFT, an organic TFT (OTFT), etc., a backlight unit, or the like may be included within the display unit 100. Meanwhile, the display unit 100 may be combined with the touch sensor included in the sensor 400 to be implemented as a touch screen.

In this case, the touch sensor may include at least one of a touch panel and a pen recognition panel. The touch panel may sense a touch input and output a touch event value corresponding to the sensed touch signal. The touch panel may be mounted under both of the main display region and the auxiliary display region of the display unit 100 or may be mounted only under the auxiliary display region of the display unit 100. As a type to allow the touch panel to sense the touch input of the user, there may be a capacitive type and a resistive type. The capacitive type senses micro electricity generated by a user's body to calculate touch coordinates. The resistive type includes tow electrode plates embedded in the touch panel and calculates touch coordinates by sensing a flow of current due to a contact between upper and lower plates at a touched point.

The pen recognition panel may sense a pen gesture input of a user depending on an operation of a user's touch pen (for example, stylus pen, digitizer pen, etc.) and output a pen proximity event value or a pen touch event value. The pen recognition panel may be mounted under at least one of the main display region and at least one auxiliary display region of the display unit 100. The pen recognition panel may be implemented as, for example, an electromagnetic resonance (EMR) scheme and may sense a touch or a proximity input depending on a change in strength of electromagnetic field due to the proximity or touch of the pen. In more detail, the pen recognition panel may be configured to include an electromagnetic induction coil sensor (not illustrated) having a grid structure and an electronic signal processing unit (not illustrated) sequentially providing alternating current signals having a predetermined frequency to each loop coil of the electromagnetic induction coil sensor. If a pen having a resonance circuit embedded therein is present around the loop coil of the pen recognition panel, a magnetic field transmitted from the corresponding loop coil generates a current based on mutual electromagnetic induction to the resonance circuit in the pen. The induction magnetic field is generated from the coil configuring the resonance circuit within the pen based on the current and the pen recognition panel may detect the induction magnetic field from the loop coil in the signal receiving state to sense an approach position or a touched position of the pen.

Meanwhile, the display unit 100 may be implemented having a form of a flexible display. The flexible display may be warped, bent, and rolled through a thin, flexible substrate like paper without damage. The flexible display may be manufactured using a generally used glass substrate and a plastic substrate. In the case of using the plastic substrate, to prevent the substrate from being damaged, the flexible display may be manufactured using a low-temperature manufacturing processor without the existing manufacturing processor. Further, by replacing the glass substrate enclosing a flexible liquid crystal with a plastic film, foldable and unfoldable flexibility may be provided to the flexible display. The flexible display may be thin, light, strong against impact, may be warped or bent, and may be manufactured in various forms.

Further, the display unit 100 may configure the main display region and the auxiliary display region using a plurality of general displays. When the display unit 100 is implemented as the general display, a bent touch screen may be configured by connecting a plurality of displays to each other.

The storage unit 310 may store various kinds of programs and data required to operate the electronic device 1000. In more detail, programs, data, etc., for configuring various kinds of screens to be displayed in the main display region and the auxiliary display region may be stored in the storage unit 310. The controller 200 uses the programs and the data stored in the storage unit 310 to display at least one of contents, an application screen, and a keypad screen in the main display region and the auxiliary display region, respectively, of the display unit 100. In other words, the controller 200 may control the display unit 100 to display at least one of the contents, the application screen, and the keypad screen. Further, if the user touch is performed on the main display region, the auxiliary display region, and a boundary region corresponding to a boundary therebetween, the controller 200 may perform a control operation corresponding to the touch.

The controller 200 includes a random access memory (RAM) 210, an ROM 220, a central processing unit CPU 230, a graphic processing unit (GPU) 240, and a bus 250. The RAM 210, the read-only memory (ROM) 220, the CPU 230, the GPU 240, etc., may be connected to each other through the bus 250.

The CPU 230 accesses the storage unit 310 to perform booting using an O/S stored in the storage unit 310. Further, the CPU executes various operations using various programs, contents, data, and the like which are stored in the storage unit 310.

The ROM 220 stores a set of commands for system booting, etc. When a turn on command is input and thus power is supplied, the CPU 230 copies the operating system (O/S) stored in the storage unit 310 to the RAM 210 according to the command stored in the ROM 220 and executes the O/S to boot the system. When the booting is completed, the CPU 230 copies the various programs stored in the storage unit 310 to the RAM 210 and executes the programs copied to the RAM 210 to execute various operations. When the booting of the electronic device 1000 is completed, the GPU 240 displays a UI screen in an activated region among the main display region and the auxiliary display region. In more detail, the GPU 240 may use an operation unit (not illustrated) and a rendering unit (not illustrated) to generate a screen including various objects such as an icon, an image, and a text. The operation unit operates attribute values, such as coordinate values, forms, sizes, and colors which will be displayed by each object according to a layout of the screen. The rendering unit generates a screen of various layouts including objects based on the attribute values which are operated by the operation unit. The screen generated by the rendering unit may be provided to the display unit 100 to be displayed in the main display region and the auxiliary display region, respectively.

The global positioning system (GPS) chip 320 is a component for receiving a GPS signal from a GPS satellite to calculate a current position of the electronic device 1000. The controller 200 may use the GPS chip 320 to calculate a user position when a navigation program is used or the current position of the user is required.

The communication unit 330 is configured to communicate with various types of external devices according to various types of communication schemes. The communication unit 330 includes a Wi-Fi chip 331, a Bluetooth chip 332, a wireless communication chip 333, a near field communication (NFC) chip 334, etc. The controller 200 uses the communication unit 330 to perform communication with various kinds of external devices.

The Wi-Fi chip 331 and the Bluetooth chip 332 respectively perform communications by a Wi-Fi scheme and a Bluetooth scheme. The WiFi chip 331 or the Bluetooth chip 332 first transmits and receives various connection information such as a Service Set Identifier (SSID) and a session key and then performs a communication connection using the various connection information, thereby transmitting and receiving various kinds of information. The wireless communication chip 333 means a chip which performs communications depending on various communication standards such as Institute of Electrical and Electronics Engineers (IEEE), Zigbee, 3rd generation (3G), 3rd generation partnership project (3GPP), and long term evolution (LTE). The NFC chip 334 means a chip which is operated by the NFC scheme using a band of 13.56 MHz among various radio frequency-identification (RF-ID) frequency bands such as 135 kHz, 13.56 MHz, 433 MHz, 860 to 960 MHz, and 2.45 GHz.

The video processor 340 is a component for processing video data which are included in contents received through the communication unit 330 or contents stored in the storage unit 310. The video processor 340 may perform various image processings, such as decoding, scaling, noise filtering, frame rate conversion, and resolution conversion, on the video data.

The audio processor 350 is a component for processing audio data which are included in contents received through the communication unit 330 or contents stored in the storage unit 310. The audio processor 350 may perform various processings such as decoding, amplification, and noise filtering on the audio data.

When a playing program for multimedia contents is executed, the controller 200 may drive the video processor 340 and the audio processor 350 to play the corresponding contents.

The display unit 100 may display an image frame generated from the video processor 340 in at least one of the main display region and the auxiliary display region.

The speaker unit 390 outputs audio data generated from the audio processor 350.

The button 360 may be any of various types of buttons such as a mechanical button, a touch pad, and a wheel which are formed in any region such as a front portion, a side portion, a rear portion, etc., of an appearance of a main body of the electronic device 1000.

The microphone 370 is a component for receiving a user voice or other sounds and converting the received user voice or other sounds into audio data. The controller 200 may use the user voice input through the microphone 370 during a call process or convert the user voice into the audio data and store the converted audio data in the storage unit 310.

The image capturing unit 380 is a component for capturing a still image or a moving picture depending on the control of the user. The image capturing unit 380 may be implemented in plural, like a front camera and a rear camera. As described above, the image capturing unit 380 may be used as a means for acquiring a user image in an embodiment for tracking the user's eyes.

When the image capturing unit 380 and the microphone 370 are provided, the controller 200 may also perform a control operation depending on the user voice input through the microphone 370 or the user motion recognized by the image capturing unit 380. That is, the electronic device 1000 may be operated in a motion control mode or a voice control mode. When the electronic device 1000 is operated in the motion control mode, the controller 200 activates the image capturing unit 380 to capture the user and tracks the motion change of the user to perform the control operation corresponding thereto. When the electronic device 1000 is operated in the voice control mode, the controller 200 may also be operated in the voice recognition mode which analyzes the user voice input through the microphone 370 and performs the control operation depending on the analyzed user voice.

In the electronic device 1000 supported by the motion control mode or the voice control mode, a voice recognition technology or a motion recognition technology may be used in various embodiments of the present disclosure as described above. For example, if the user takes a motion like selecting the object displayed on the home screen or pronounces a voice command corresponding to the object, the corresponding object is determined to be selected and the control operation matched with the object may be performed.

The sensor 400 senses various states of the electronic device 1000 and the user interaction. For example, the sensor 400 may sense a gripped state in which the user grips the electronic device 1000. In more detail, the electronic device 1000 may be rotated or tilted in various directions. In this case, the sensor 400 may include and/or use at least one of various sensors such as a geomagnetic sensor, a gyro sensor, and an accelerator sensor to sense a gradient, etc., of the electronic device 1000 which is gripped by the user based on a rotational motion or a gravity direction.

Further, as described above, the sensor 400 may sense the touch input on the main display region and the auxiliary display region.

In addition, although not illustrated in FIG. 11A, according to an embodiment of the present disclosure, the electronic device 1000 may further include a universal serial bus (USB) port to which a USB connector may be connected, various external input ports for connecting to various external terminals such as a headset, a mouse, and an local area network (LAN), a digital multimedia broadcasting (DMB) chip receiving and processing a DMB signal, various sensors, etc.

Meanwhile, as described above, the storage unit 310 may store various programs.

Figure 11B:
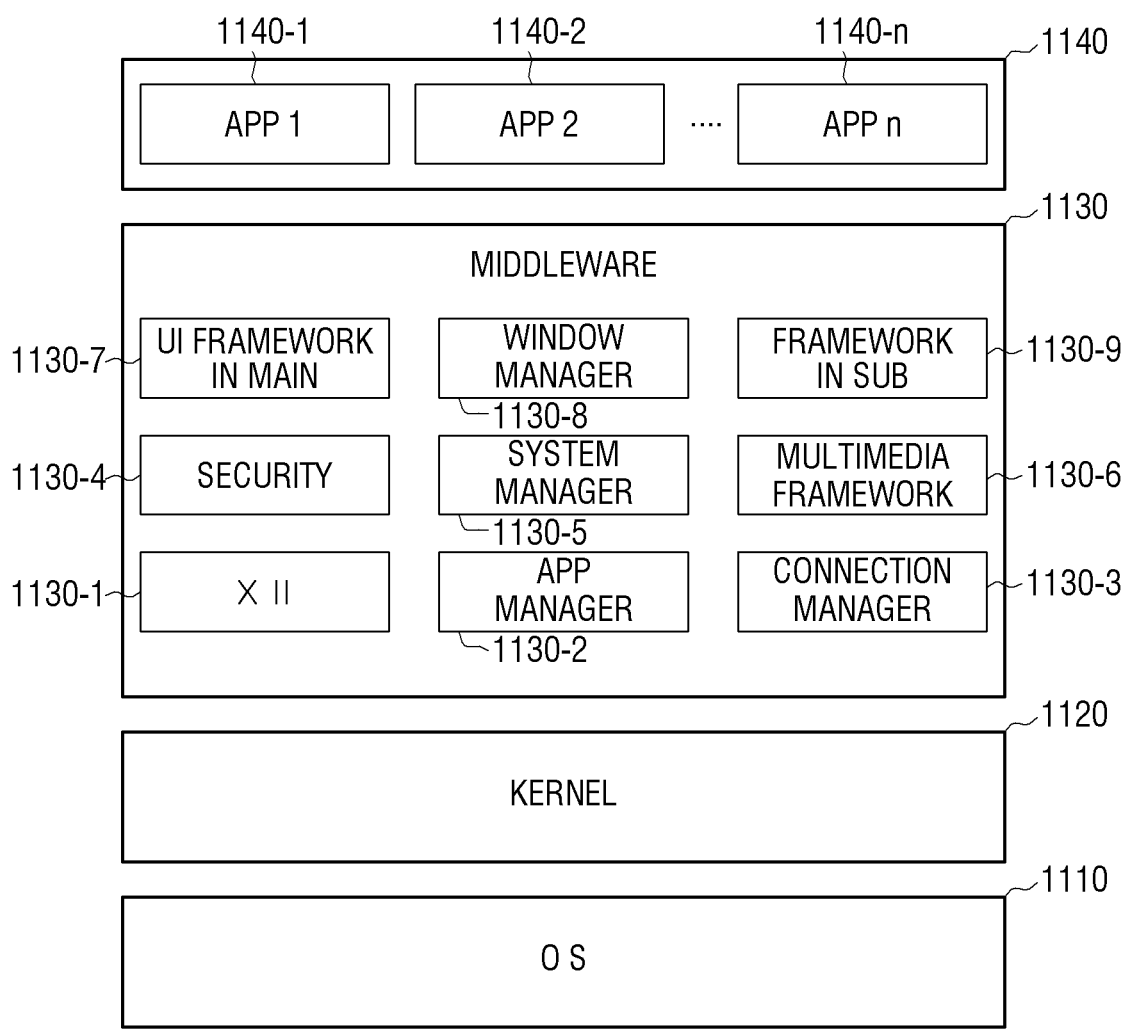
FIG. 11B is a block diagram for describing a structure of software stored in an electronic device according to various embodiments of the present disclosure.

FIG. 11B is a block diagram for describing a structure of software stored in an electronic device according to various embodiments of the present disclosure.

Referring to FIG. 11B, the storage unit 310 may store software such as an operating system (OS) 1110, a kernel 1120, a middleware 1130, and an application 1140.

The OS 1110 serves to control and manage the general operations of hardware. That is, the OS 1110 is a hierarchy serving basic functions such as hardware management, memory, and security.

The kernel 1120 serves as a path through which various signals in addition to a touch signal sensed by the sensor 400 are transferred to the middleware 1120.

The middleware 1120 includes various software modules controlling the operation of the electronic device 1000. Referring to FIG. 11B, the middleware 1130 includes an X11 module 1130-1, an APP manager 1130-2, a connection manager 1130-3, a security module 1130-4, a system manager 1130-5, a multimedia framework 1130-6, a main UI framework 1130-7, a window manager 1130-8, and a sub UI framework 1130-9.

The X11 module 1130-1 is a module for receiving various event signals from various kinds of hardware included in the electronic device 1000. Here, the event may be variously set like an event that the user gesture is sensed, an event that a system alarm is generated, and an event that a specific program is executed or ends.

The APP manager 1130-2 is a module for managing an execution state of various applications 1140 installed in the storage unit 310. The application (APP) manager 1130-2 calls an application corresponding to the corresponding event and executes the application when the X11 module 1130-1 senses an application execution event.

The connection manager 1130-3 is a module for supporting a wired or wireless network connection. The connection manager 1130-3 may include various detailed modules such as a Device NET (DNET) module and a universal plug and play (UPnP) module.

The security module 1130-4 is a module for supporting certification, request permission, secure storage of hardware, and the like.

The system manager 1130-5 monitors a state of each component within the electronic device 1000 and provides the monitored results to other modules. For example, when a residual quantity of a battery is insufficient, an error occurs, or a communication connection state is broken, etc., the system manager 1130-5 may provide the monitored result to the main UI framework 1130-7 or the sub UI framework 1130-9 to output a notification message or a notification sound.

The multimedia framework 1130-6 is a module for playing multimedia contents which are stored in the electronic device 1000 or provided from external sources. The multimedia framework 1130-6 may include a player module, a camcoder module, a sound processing module, and the like. Therefore, the multimedia framework 1130-6 may perform an operation of playing various multimedia contents to generate and play a screen and a sound.

The main UI framework 1130-7 is a module for providing various kinds of UIs to be displayed in the main display region of the display unit 100 and the sub UI framework 1130-9 is a module for providing various kinds of UIs to be displayed in the auxiliary display region. The main UI framework 1130-7 and the sub UI framework 1130-9 may include an image compositor module for configuring various kinds of objects, a coordinate compositor calculating coordinates at which an object is displayed, a rendering module for rendering the configured object to the calculated coordinates, a two dimensional (2D)/three dimensional (3D) UI toolkit providing a tool for configuring a 2D or 3D type of UI, etc.

The window manager 1130-8 may sense a touch event using a user's body or a pen or other input events. When the events are sensed, the window manager 1130-8 transfers the event signal to the main UI framework 1130-7 or the sub UI framework 1130-9 to perform the operation corresponding to the event.

In addition, when the user touches and drags the screen, various program modules such as a handwriting module for drawing a line depending on a drag trajectory, an angle calculation module for calculating a pitch angle, a roll angle, a yaw angle, etc., may also be stored based on the sensed sensor value.

The application module 1140 includes applications 1140-1, 1140-2 to 1140-n for supporting various functions. For example, the application module 1140 may include program modules for providing various services such as a navigation program module, a game module, an e-book module, a calendar module, and an alarm management module. The applications may be installed as a default and may be arbitrarily installed and used by a user in use. When the object is selected, the CPU 230 may execute an application corresponding to an object selected by using the application module 1140.

The software structure illustrated in FIG. 11B is only an example, and therefore the present disclosure is not necessarily limited thereto. Therefore, if necessary, some of the software structure may be omitted, changed, or added. For example, the storage unit 310 may additionally store various programs such as a sensing module for analyzing signals sensed by various sensors, messaging modules of a messenger program, a short message service (SMS) and multimedia message service (MMS) program, and an e-mail program, etc., a call information aggregator program module, a VoIP module, and a web browser module.

Meanwhile, as described above, the electronic device 1000 may be implemented as various types of devices such as a cellular phone, a tablet PC, a laptop PC, a PDA, an MP3 player, a digital photo frame, TV, a PC, and a kiosk. Therefore, the configuration illustrated in FIGS. 11A and 11B may be variously changed depending on a kind of the electronic device 1000.

As described above, the electronic device 1000 may be implemented as various forms and configurations. The controller 200 of the electronic device 1000 may support various user interactions according to an embodiment of the present disclosure.

Hereinafter, a keypad display method of an electronic device according to various embodiments of the present disclosure will be described in more detail with reference to FIGS. 12A to 30.

Figures 12A, 12B, 12C:
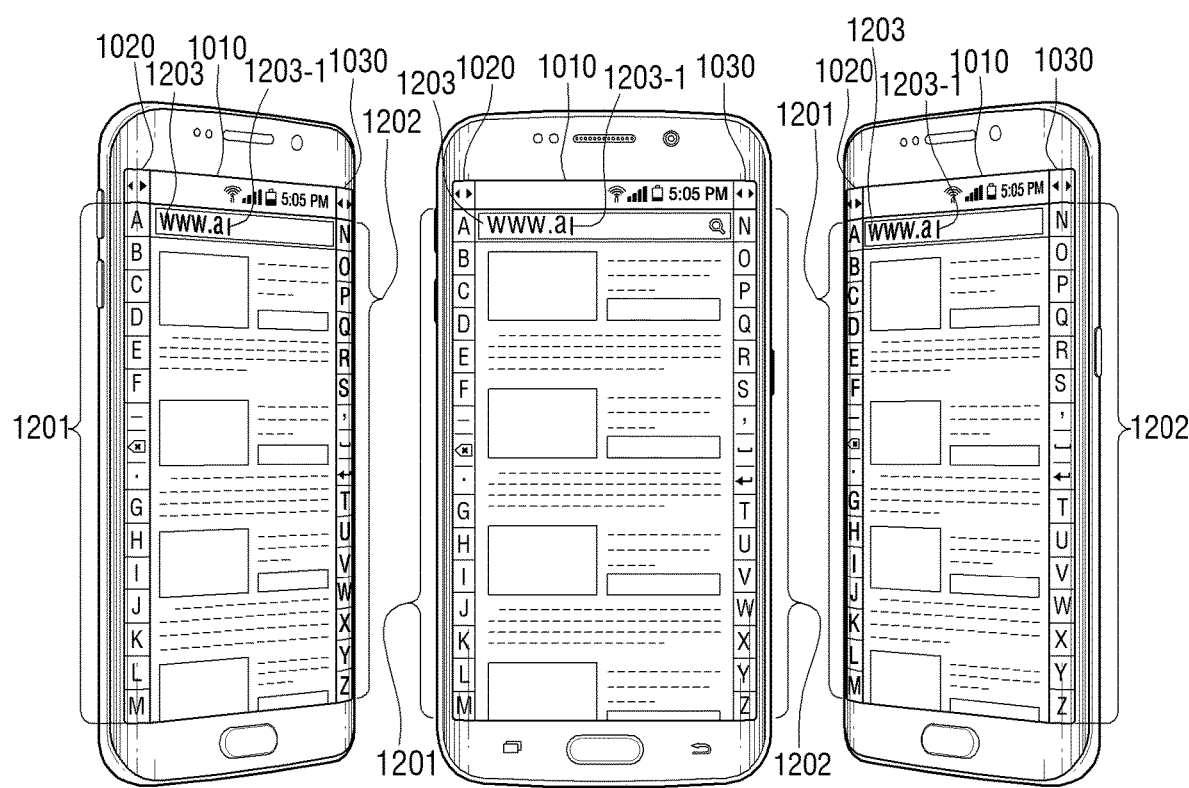

FIGS. 12A to 12C are diagrams illustrating an auxiliary display region in which a keypad is displayed, according to an embodiment of the present disclosure.

Referring to FIGS. 12A to 12C, the controller 200 may control the display unit 100 to display a first keypad 1201 and a second keypad 1202 in the first auxiliary display region 1020 and the second auxiliary display region 1030, respectively. Further, the controller 200 may control the display unit 100 to display the application screen to which the result of the user interaction through the first keypad 1201 and the second keypad 1202 may be applied in the main display region 1010. FIGS. 12A to 12C illustrate a web page application as the application screen as a target, in which a kind of application screen which may be displayed in the main display region is not limited thereto. For example, the application screen may be various kinds of application execution screens, such as a document application screen, a memo application screen, a message application screen, or the like.

The application screen may include a character input field 1203 to which a character is input according to the user interaction through the first keypad 1201 and the second keypad 1202. The character input field 1203 may include a cursor 1203-1. The cursor 1203-1 may instruct a position at which the character is input to the character input field 1203 according to the user interaction through the keypad.

The keypad may include a plurality of UI elements. The UI elements may include at least one of editing UI elements among the character UI elements.

The character UI element may occupy one region of the keypad while corresponding to one character. Here, the character may be characters of various countries such as a letter of an alphabet, Hangeul, and Chinese character and may also include numerals, special characters, emoticons, or the like. In addition, all the visual sign systems for communication between persons may be characters. For example, if the first keypad includes each of the UI elements corresponding to the letters 'A" to 'M', respectively, the second key pad may include character UI elements corresponding to the letters 'N' to 'Z', respectively.

The character UI elements may be arranged along a vertical direction of one side surface of the electronic device

1000. For example, the UI elements may be vertically arranged in the auxiliary display region according to a predetermined sequence. The predetermined sequence may be a sequence of letters, a numeral sequence, a Hangeul sequence, or the like.

The editing UI element may occupy one region of the keypad while corresponding to editing functions of deleting the pre-input character, instructing the position at which the character will be displayed, or the like. Here, the editing function may include, for example, a backspace function, a space function, an enter function, a deletion function, a tab function, a character input completion function, or upper/lower/left/right moving functions.

Meanwhile, as illustrated in FIGS. 12A to 12C, the editing UI elements may be positioned at a center of the keypad and the character UI elements may be positioned at an upper end or a lower end of the keypad based on the editing UI elements.

The character input field may be provided as one or more strings. Further, the character input field may also be provided to the main display region as a plurality of strings and may also be provided to the main display region as one string which is a summed size of the plurality of strings. The character according to the user interaction through the keypad may be input to the character input field.

As such, as the keypads are displayed in the auxiliary display regions 1020 and 1030, the application screen of the main display region 1010 may be sufficiently seen without being covered with the keypad. In particular, the user interaction through the first keypad and the second keypad, respectively, using fingers of both hands may be performed, such that a user interaction rate using the keypad may be improved.

Figures 13A, 13B:
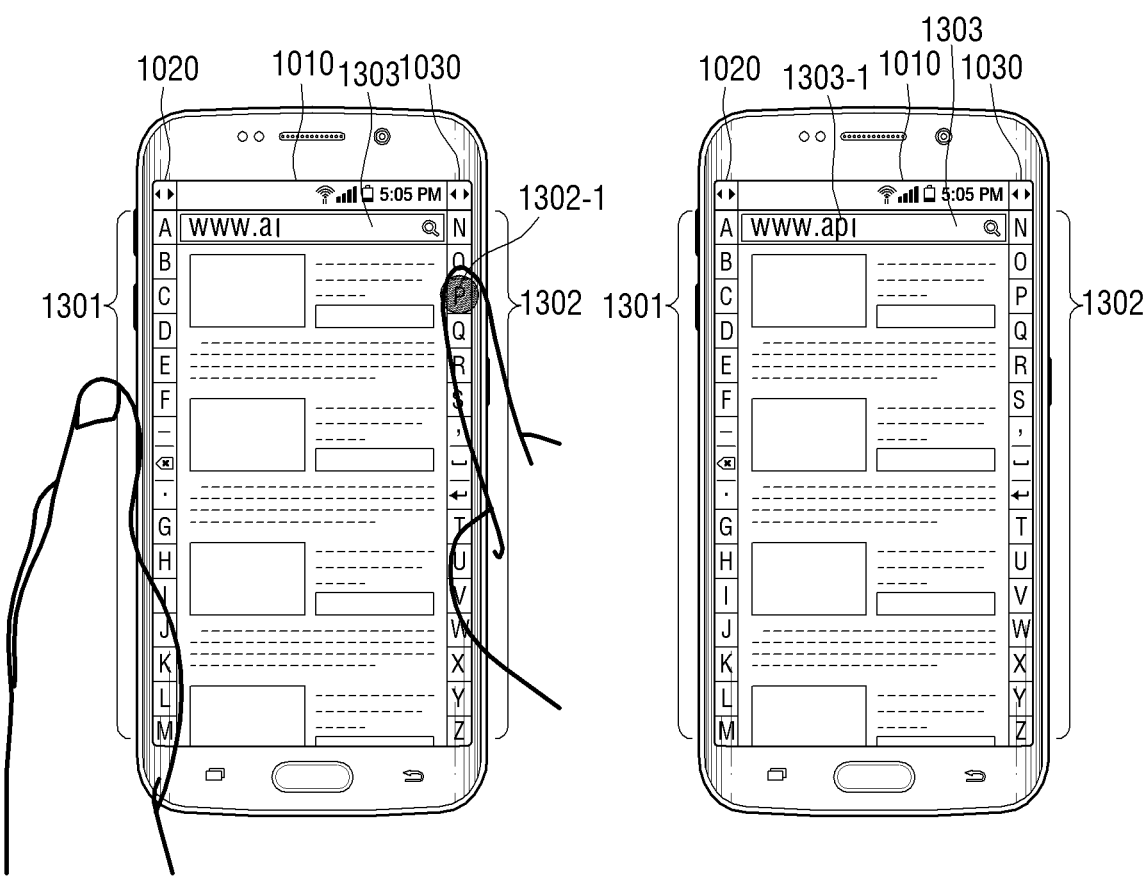

FIGS. 13A and 13B are diagrams illustrating a user interaction using a keypad displayed in an auxiliary display region, according to an embodiment of the present disclosure.

Referring to FIG. 13A, the controller 200 may control the display unit 100 to display a first keypad 1301 and a second keypad 1302 in the first auxiliary display region 1020 and the second auxiliary display region 1030, respectively, and display the application screen to which the result of the user interaction through the first keypad 1301 and the second keypad 1302 is applied in the main display region 1010. In this case, the sensor 400 may sense the user interaction for selecting the UI element 1302-1 included in the second keypad 1302. For example, the sensor 400 may sense a touch input for touching the UI element 1302-1 included in the second keypad 1302.

According to the user interaction, as illustrated in FIG. 13B, the controller 200 may control the display unit 100 to display the character 1303-1 corresponding to the selected UI element 1302-1 in the character input field 1303 included in the main display region 1010.

FIGS. 14A to 17B are diagrams illustrating a user interaction of controlling a keypad displayed in an auxiliary display region, according to various embodiment of the present disclosure.

Figures 14A, 14B:
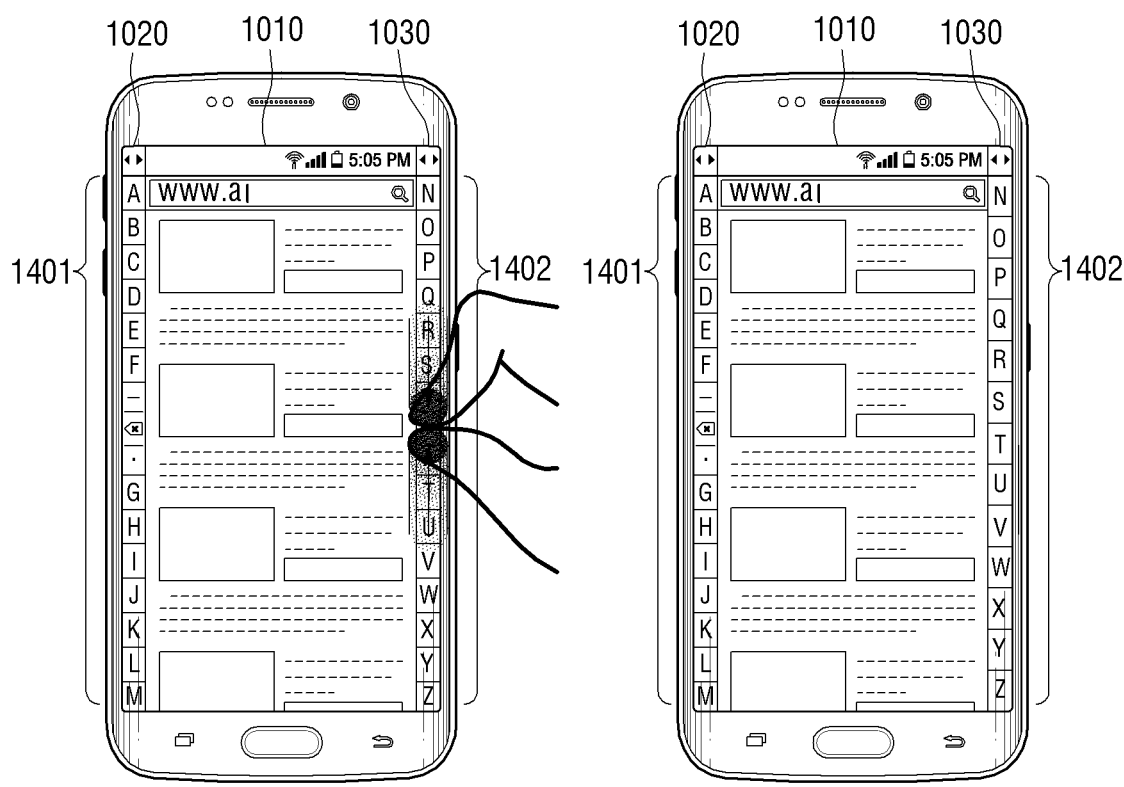

Referring to FIG. 14A, the controller 200 may control the display unit 100 to display a first keypad 1401 and a second keypad 1402 in the first auxiliary display region 1020 and the second auxiliary display region 1030, respectively. In this case, the sensor 400 may sense the user interaction for controlling the sizes of the UI elements included in the second keypad 1402. For example, the sensor 400 may sense the touch input of the user performing a pinch gesture on the second auxiliary display region 1030. Here, the pinch gesture may be a pinch out gesture.

According to the user interaction, as illustrated in FIG. 14B, the controller 200 may control the display unit 100 to display a second keypad 1402 including the UI elements with the increased height in the second auxiliary display region 1030. In more detail, the controller 200 may control the display unit 100 to display the second keypad 1402 in the second auxiliary display region 1030 while the editing UI elements positioned at a center of the second keypad 1402 disappear and the sizes of the character UI elements expand up to a region in which the editing UI elements disappear.

Figures 15A, 15B:
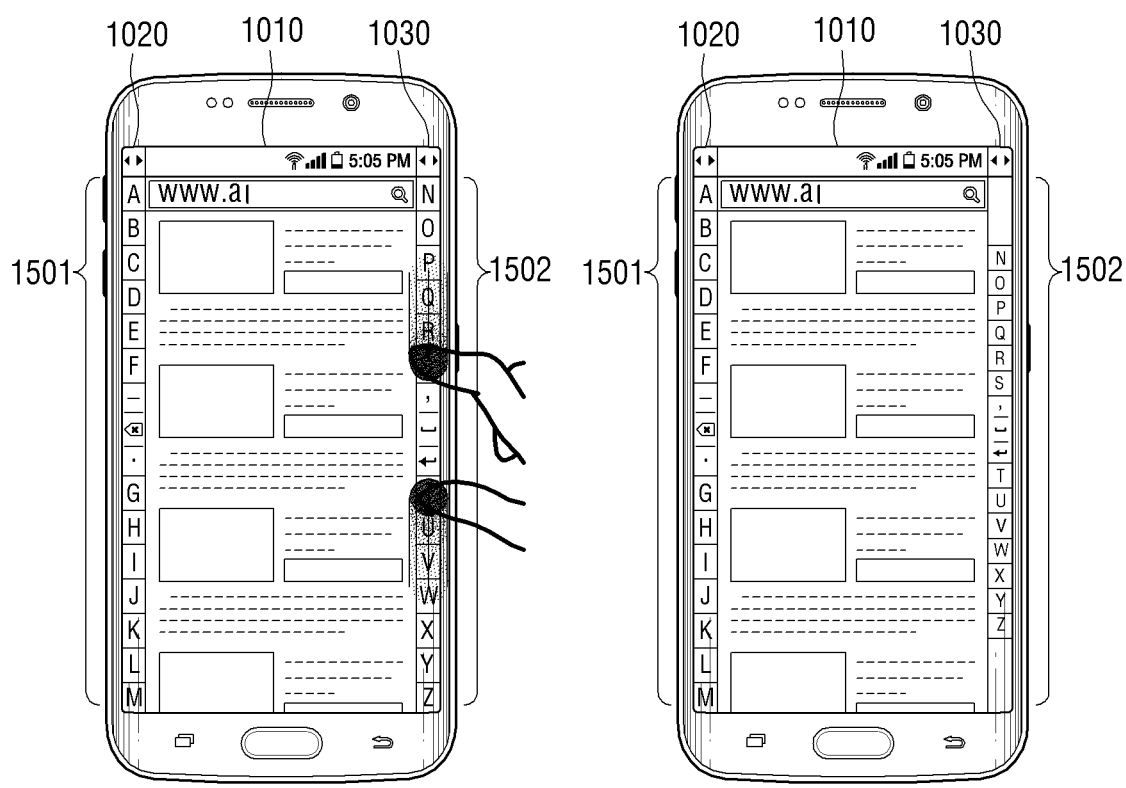

Referring to FIG. 15A, the controller 200 may control the display unit 100 to display a first keypad 1501 and a second keypad 1502 in the first auxiliary display region 1020 and the second auxiliary display region 1030, respectively. In this case, the sensor 400 may sense the user interaction for controlling the sizes of the UI elements included in the second keypad 1502. For example, the sensor 400 may sense the touch input of the user performing the pinch gesture on the second auxiliary display region 1030. Here, the pinch gesture may be a pinch in gesture.

According to the user interaction, as illustrated in FIG. 15B, the controller 200 may control the display unit 100 to display the second keypad 1502 including the UI elements with decreased height in the second auxiliary display region 1030. In more detail, the controller 200 may control the display unit 100 to display the second keypad 1502 in the second auxiliary display region 1030 while sizes of UI elements included in the second keypad 1502 are reduced in proportion to a moving amount of touch drag depending on the pinch gesture.

Figures 16A, 16B:
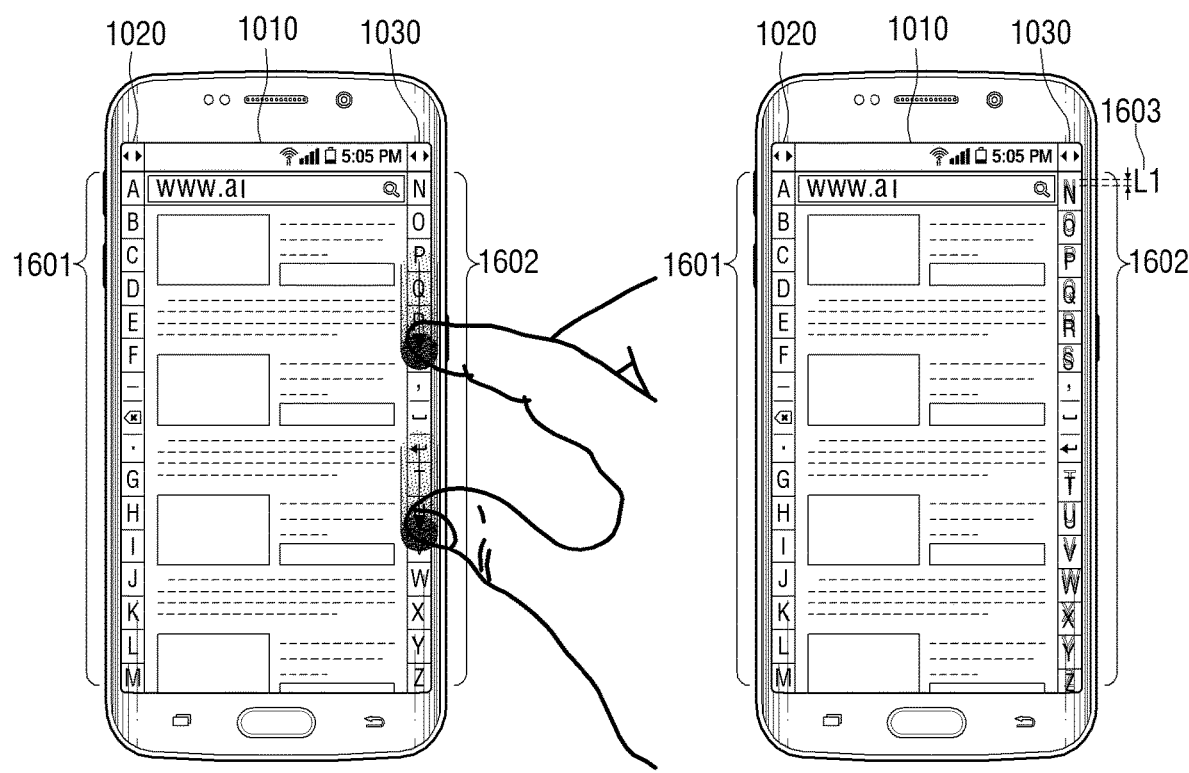

Referring to FIG. 16A, the controller 200 may control the display unit 100 to display a first keypad 1601 and a second keypad 1602 in the first auxiliary display region 1020 and the second auxiliary display region 1030, respectively. In this case, the sensor 400 may sense a user interaction for moving positions of UI elements included in a second keypad 1602. For example, the sensor 400 may sense the touch input of the user dragged in one direction while keeping a multi touch on the second auxiliary display region 1030.

According to the user interaction, as illustrated in FIG. 16B, the controller 200 may control the display unit 100 to display the second keypad including UI elements whose positions move as much as a distance L1 1603 in the second auxiliary display region 1030. In this case, the controller 200 may also move the UI elements in proportion to the moving amount of the touch drag in a direction in which the touch drag is made.

Figures 17A, 17B:
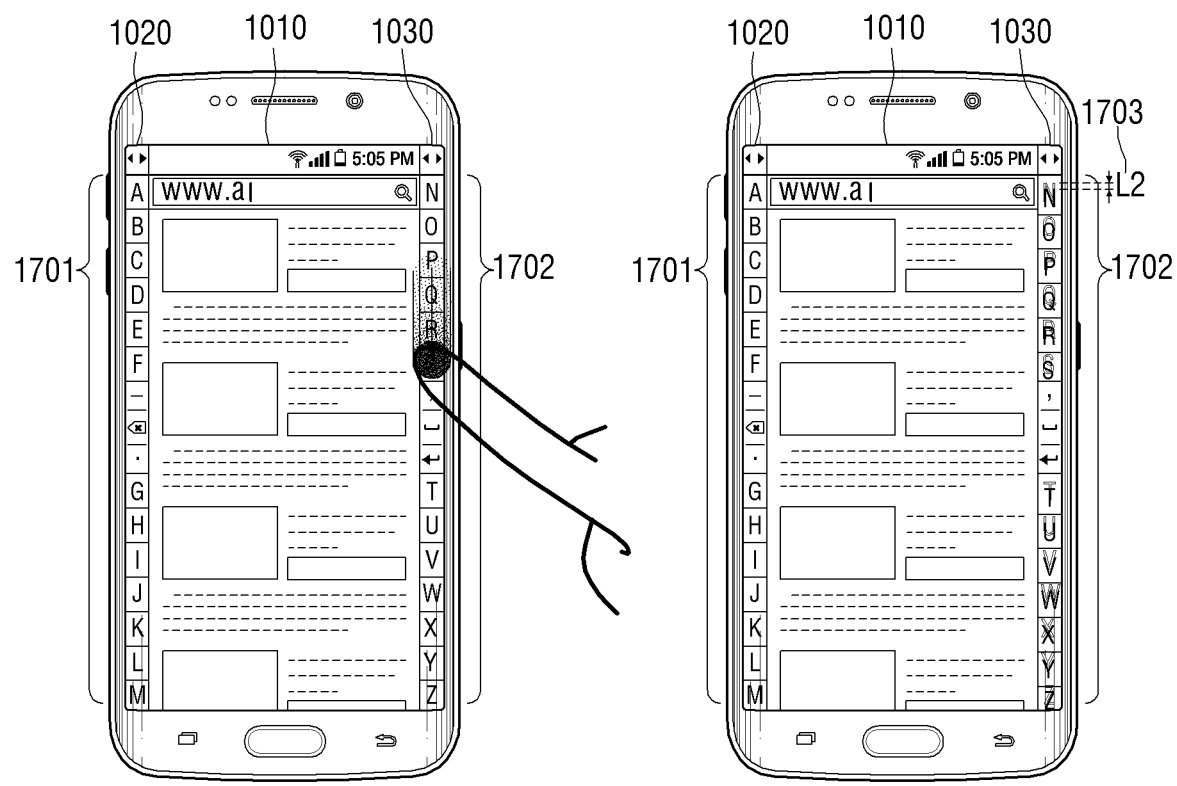

Referring to FIG. 17A, the controller 200 may control the display unit 100 to display a first keypad 1701 and a second keypad 1702 in the first auxiliary display region 1020 and the second auxiliary display region 1030, respectively. In this case, the sensor 400 may sense a user interaction for moving positions of UI elements included in a second keypad 1702. For example, the sensor 400 may sense the touch input of the user vertically dragged while keeping a long touch at one point on the second auxiliary display region 1030.

According to the user interaction, as illustrated in FIG. 17B, the controller 200 may control the display unit 100 to display the second keypad 1702 including UI elements whose positions move as much as distance L2 1703 in the second auxiliary display region 1030. In this case, the controller 200 may also move the UI elements in proportion to the moving amount of the touch drag in a direction in which the touch drag is made.

FIGS. 18A to 19B are diagrams illustrating a user interaction of displaying other keypads displayed in an auxiliary display region, according to an embodiment of the present disclosure.

Figure 18A:
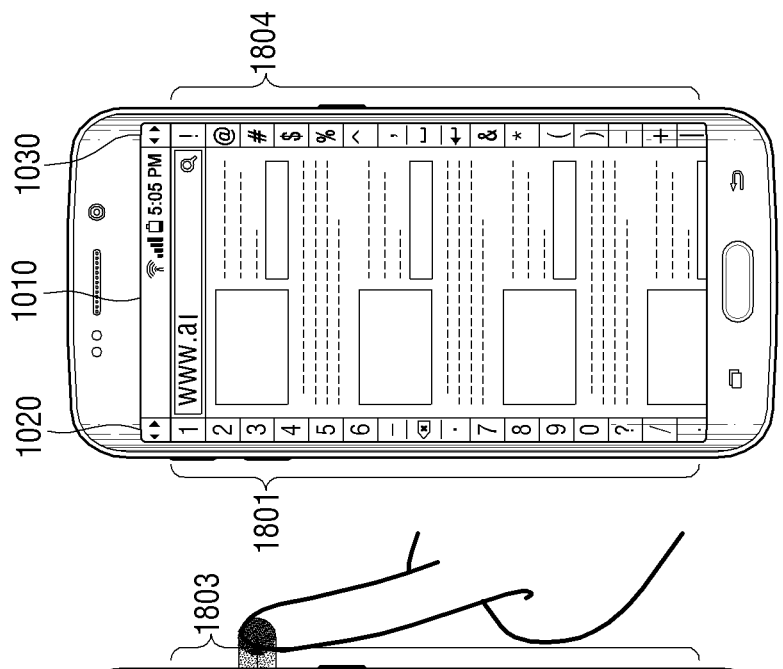

Referring to FIG. 18A, the controller 200 may control the display unit 100 to display a first keypad 1801 and a second keypad 1802 in the first auxiliary display region 1020 and the second auxiliary display region 1030, respectively. In this case, the sensor 400 may sense the user interaction for displaying other keypads. For example, the sensor 400 may sense a touch input of a user for touching one point on the second auxiliary display region 1030 and then swiping the one point in a horizontal direction.

Figure 18B:
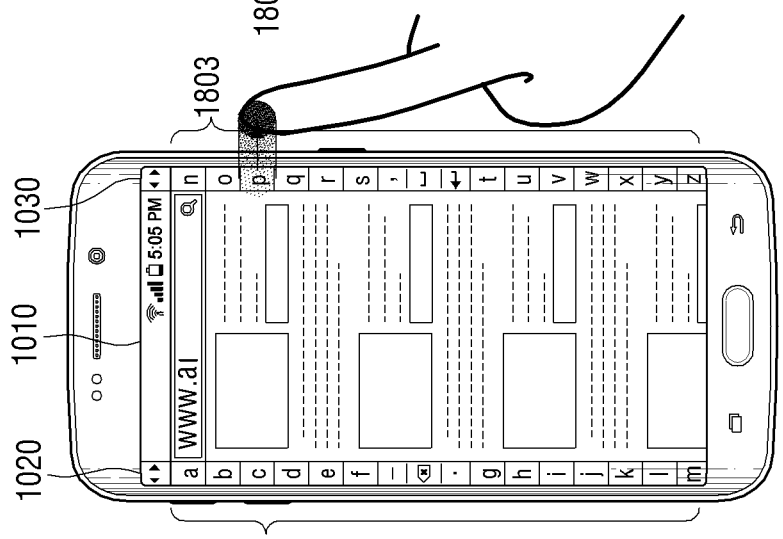

According to the user interaction, as illustrated in FIG. 18B, the controller 200 may control the display unit 100 so that the second keypad 1802 is removed and a third keypad 1803 is displayed in the second auxiliary display region 1030. In this case, UI elements included in the second keypad 1802 and UI elements included in the third keypad 1803 may be different from each other. For example, the UI elements included in the second keypad 1802 are UI elements corresponding to capital letters, while the UI elements included in the third keypad 1803 may be UI elements corresponding to lower case letters. Next, the sensor 400 may sense a user interaction for displaying another keypad. For example, the sensor 400 may sense a touch input of a user for touching one point on the second auxiliary display region 1030 and then swiping the one point in a horizontal direction.

Figure 18C:
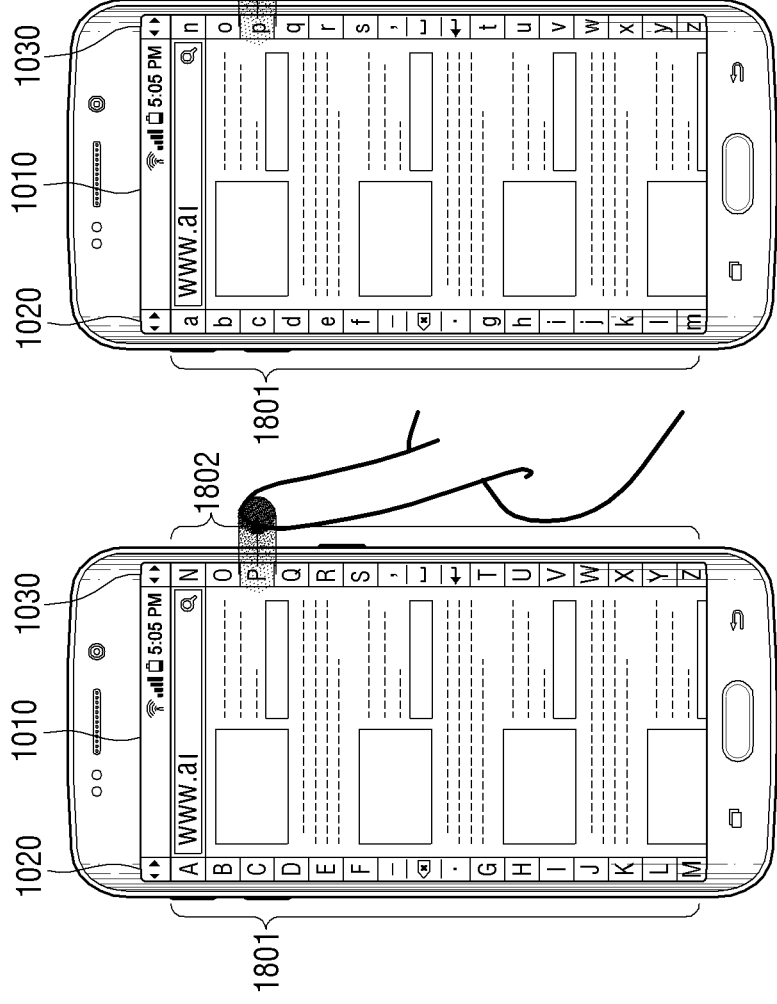

According to the user interaction, as illustrated in FIG. 18C, the controller 200 may control the display unit 100 so that the third keypad 1803 is removed and a fourth keypad 1804 is displayed in the second auxiliary display region 1030. In this case, UI elements included in the third keypad 1803 and UI elements included in the fourth keypad 1804 may be different from each other. For example, the UI elements included in the third keypad 1803 are UI elements corresponding to the lower case letters, while the UI elements included in the fourth keypad 1804 may be UI elements corresponding to special characters.

Figures 19A, 19B:
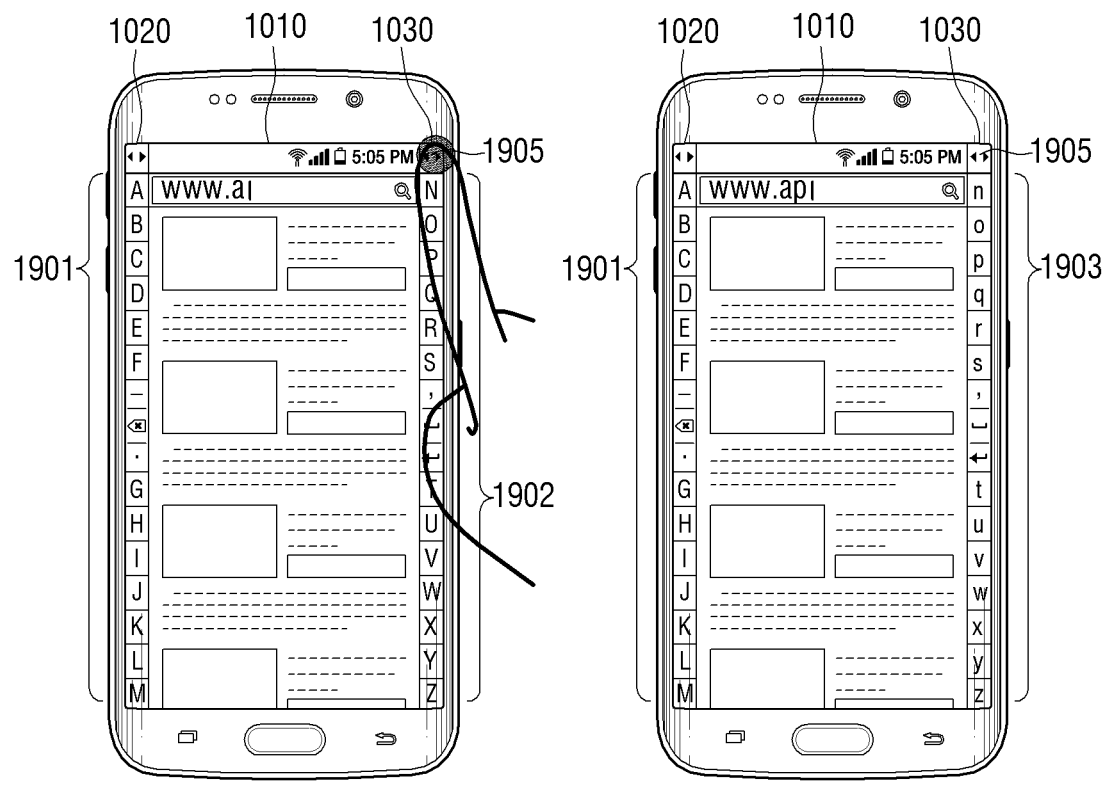

Referring to FIG. 19A, the controller 200 may control the display unit 100 to display a first keypad 1901 and a second keypad 1902 in the first auxiliary display region 1020 and the second auxiliary display region 1030, respectively. Further, the controller 200 may control the display unit 100 to display a keypad switching button 1905 for displaying other keypads in the second auxiliary display region 1030. In this case, the sensor 400 may sense the user interaction for displaying other keypads. For example, the sensor 400 may sense the touch input of the user touching the keypad switching button 1905.

According to the user interaction, as illustrated in FIG. 19B, the controller 200 may control the display unit 100 so that the second keypad 1902 is removed and a third keypad 1903 is displayed in the second auxiliary display region 1030. In this case, UI elements included in the second keypad 1902 and UI elements included in the third keypad 1903 may be different from each other.

FIGS. 20A to 20C are diagrams illustrating a user interaction editing the keypad displayed in the auxiliary display region, according to an embodiment of the present disclosure.

The user may execute a keypad editing mode for editing a keypad. For example, the user may execute the keypad editing mode by selecting a menu button of the electronic device 1000. Alternatively, the user may execute the keypad editing mode through an environmental setting application. Alternatively, the user may execute the keypad editing mode through a quick panel. In addition, there may be various methods for executing, by the user, the keypad editing mode.

Referring to FIG. 20A, if the keypad editing mode is executed, the controller 200 may control the display unit 100 to display a plurality of keypads 2002, 2003, and 2004 in a portion of the main display region 1010 and the auxiliary display region 1030. Further, the controller 200 may control the display unit 100 to display a keypad 2001 in a portion of the main display region 1010 and the auxiliary display region 1020. The plurality of keypads 2002, 2003, and 2004 each may include different UI elements. For example, the second keypad 2002 among the plurality of keypads 2002, 2003, and 2004 may include the UI elements corresponding to the lower case letters, the third keypad 2003 may include the UI elements corresponding to the capital letters, and the fourth keypad 2004 may include the UI elements corresponding to the special character. In this case, the sensor 400 may sense a user interaction for exchanging one UI element 2002-1 included in the second keypad 2002 among the plurality of keypads 2002, 2003, and 2004 with one UI element 2003-1 included in the third keypad 2003. For example, the sensor 400 may sense a touch input for performing the touch on the one UI element 2002-1 included in the second keypad 2002 among the plurality of keypads 2002, 2003, and 2004 and then dragging the corresponding touch to be released on the one UI element 2003-1 included in the third keypad 2003.

Referring to FIG. 20B, the controller 200 may control the display unit 100 to exchange the one UI element 2002-1 included in the second keypad 2002 with the one UI element 2003-1 included in the third keypad 2003 and display it. In more detail, the controller 200 may control the display unit 100 to exchange the one UI element 2002-1 corresponding to a capital letter 'R' with the one UI element 2003-1 corresponding to a lower case letter 'r' and display it in the second keypad 2002 and exchange the one UI element 2003-1 corresponding to the lower case letter 'r' with the one UI element 2002-1 corresponding to the capital letter 'R' and display it in the third keypad 2003. Next, the sensor 400 may sense the user interaction for determining a keypad to be displayed in the second auxiliary display region 1030 among the plurality of keypads 2002, 2003, and 2004. For example, the sensor 400 may sense a touch input for long touching the third key pad 2003 among the plurality of keypads 2002, 2003, and 2004 more than a predetermined time.

Referring to FIG. 20C, the controller 200 may control the display unit 100 to display the determined third keypad 2003 in the second auxiliary display region 1030. In this case, as the keypad editing result, the exchanged one UI element 2002-1 included in the second keypad 2002 may be displayed while being included in the third keypad 2003.

FIGS. 21A to 23B are diagrams illustrating a user interaction of displaying a keypad associated with a UI element included in a keypad displayed in an auxiliary display region, according to an embodiment of the present disclosure.

Figures 21A, 21B:
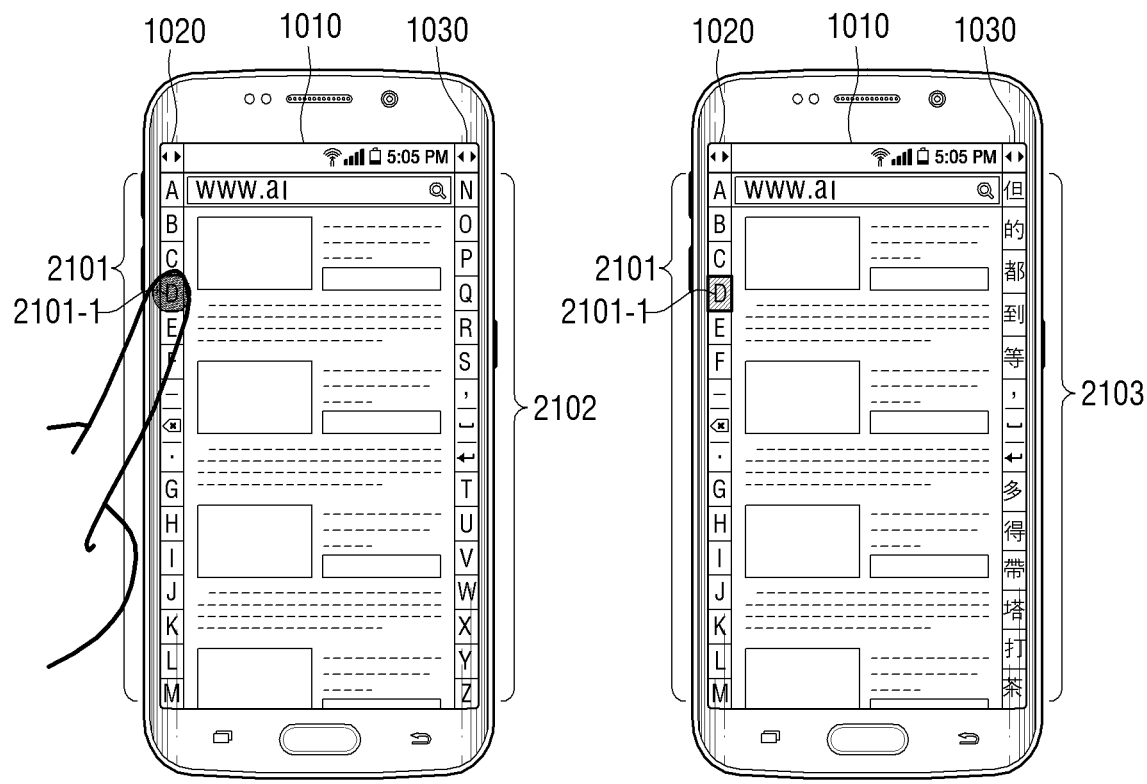

Referring to FIG. 21A, the controller 200 may control the display unit 100 to display a first keypad 2101 and a second keypad 2102 in the first auxiliary display region 1020 and the second auxiliary display region 1030, respectively. In this case, the UI elements corresponding to the letters 'A' to 'M', respectively, may be included in the first keypad 2101 and the UI elements corresponding to the letters 'N' to 'Z' may be included in the second keypad 2102. Next, the sensor 400 may sense a user interaction for displaying UI elements associated with one UI element 2101-1 included in the first keypad 2101. For example, the sensor 400 may sense a touch input for performing a long touch or hovering on the UI element 2101-1 included in the first keypad 2101 more than a predetermined time.

Referring to FIG. 21B, the controller 200 may control the display unit 100 to display a third keypad 2103 including UI elements associated with a character corresponding to the selected UI element 2101-1 in the second auxiliary display region 1030. For example, when a character corresponding to the selected UI element 2101-1 is the letter 'D', the controller 200 may control the display unit 100 to display the third keypad 2103 including UI elements corresponding to a Chinese character or a candidate Chinese character having the letter 'D' as a pinyin in the second auxiliary display region 1030. In this case, the controller 200 may control the display unit 100 to display the selected UI element 2101-1 while the selected UI element is highlighted during the display of the third keypad 2103.

Figures 22A, 22B:
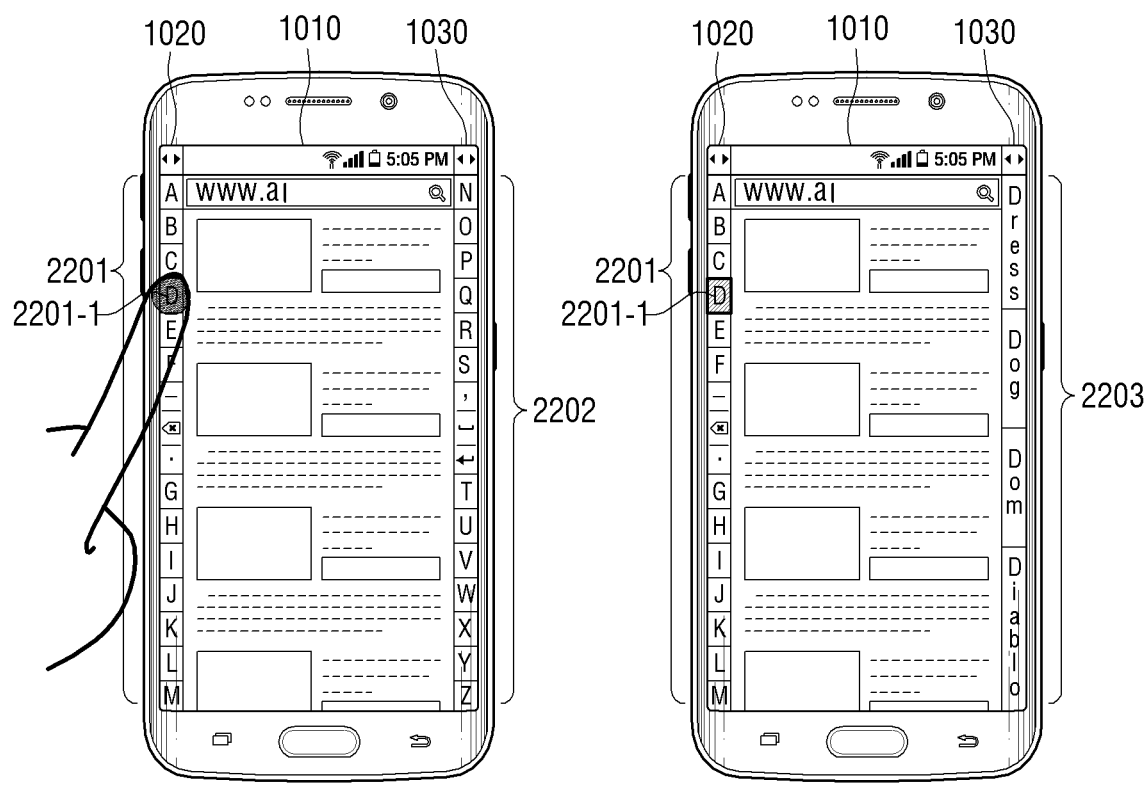

Referring to FIG. 22A, the controller 200 may control the display unit 100 to display a first keypad 2201 and a second keypad 2202 in the first auxiliary display region 1020 and the second auxiliary display region 1030, respectively. In this case, the UI elements corresponding to the letters 'A' to 'M', respectively, may be included in the first keypad 2201 and the UI elements corresponding to the letters 'N' to 'Z' may be included in the second keypad 2202. Next, the sensor 400 may sense a user interaction for displaying a UI element associated with a UI element 2201-1 included in the first keypad 2201. For example, the sensor 400 may sense a touch input for performing a long touch or hovering on the UI element 2201-1 included in the first keypad 2201 more than a predetermined time.

Referring to FIG. 22B, the controller 200 may control the display unit 100 to display a third keypad 2203 including UI elements associated with words corresponding to the selected UI element 2201-1 in the second auxiliary display region 1030. For example, when the character corresponding to the selected UI element 2201-1 is the letter 'D', the controller 200 may control the display unit 100 to display the third keypad 2203 including UI elements corresponding to words starting as the letter 'D' by referring to word history information input by the user in the second auxiliary display region 1030. In this case, the UI elements corresponding to the words starting as the letter 'D' may be arranged in the third keypad 2203 in an order of words recently input by the user.

Figures 23A, 23B:
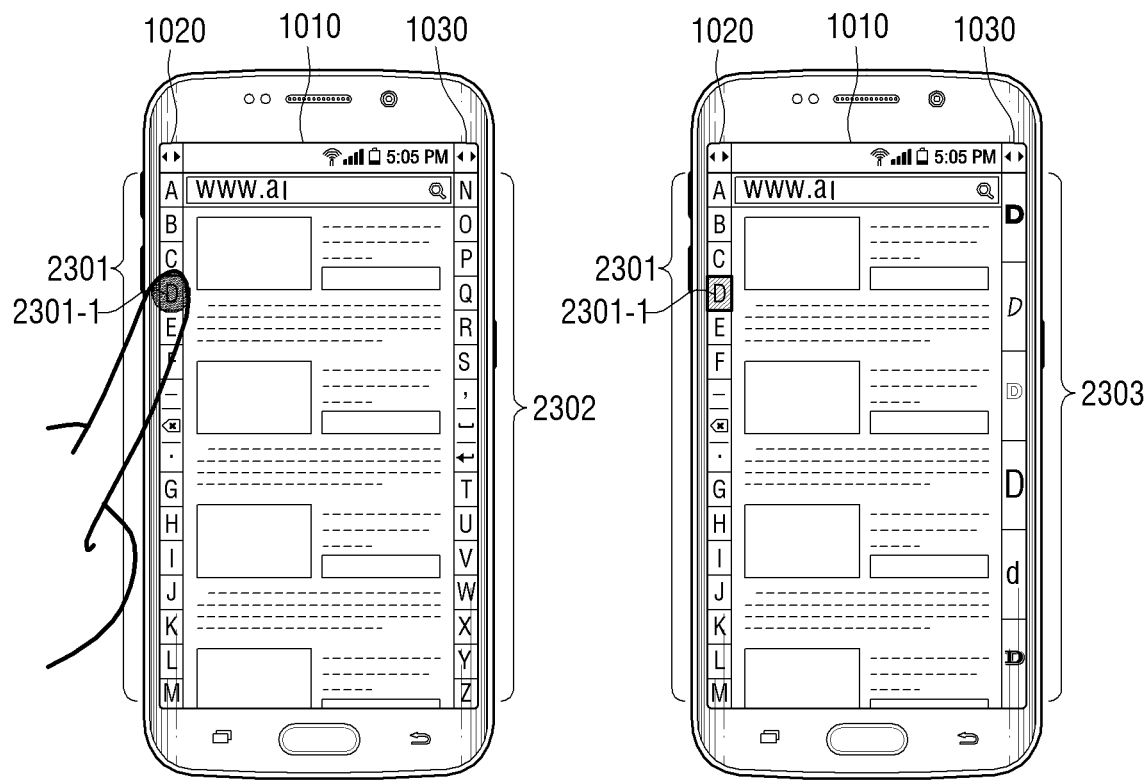

Referring to FIG. 23A, the controller 200 may control the display unit 100 to display a first keypad 2301 and a second keypad 2302 in the first auxiliary display region 1020 and the second auxiliary display region 1030, respectively. In this case, the UI elements corresponding to characters each included in a first hierarchy may be included in the first keypad 2301 and the UI elements corresponding to other characters each included in the first hierarchy may be included in the second keypad 2302. Next, the sensor 400 may sense a user interaction for selecting a UI element 2301-1 corresponding to one character included in the first hierarchy. For example, the sensor 400 may sense the touch input for performing the long touch or the hovering on the UI element 2301-1 corresponding to one character included in the first hierarchy more than a predetermined time.

Referring to FIG. 23B, the controller 200 may control the display unit 100 to display a third keypad 2303 including UI elements each corresponding to characters included in a second hierarchy associated with the selected UI element 2301-1 in the second auxiliary display region 1030. In this case, the characters included in the second hierarchy may be characters belonging to a subgroup of the characters included in the first hierarchy. For example, the characters included in the second hierarchy may be small letters of the characters included in the first hierarchy, a bold type, a cursive script, a character of a first color, and characters of a first size.

Figures 24A, 24B:
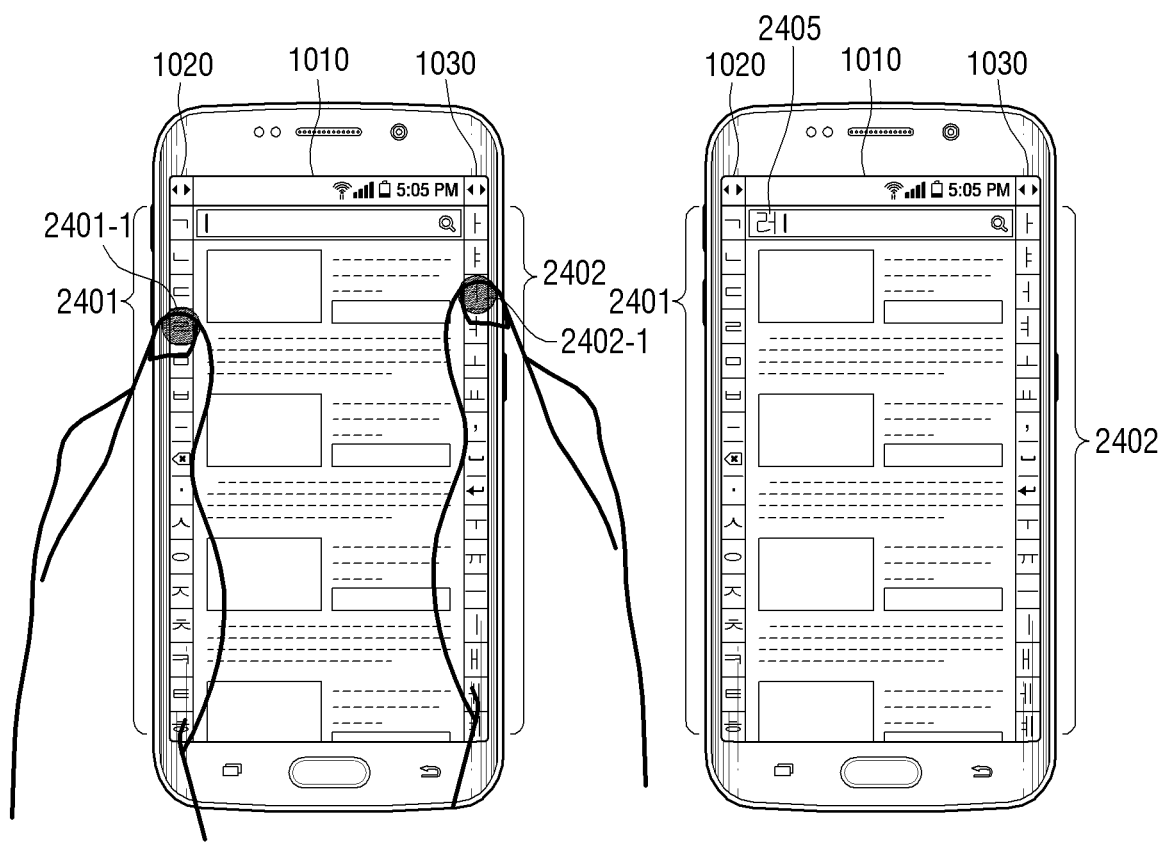

FIGS. 24A and 24B are diagrams illustrating a user interaction using a keypad divided according to characteristics of characters, according to an embodiment of the present disclosure.

Referring to FIG. 24A, the controller 200 may control the display unit 100 to display a first keypad 2401 and a second keypad 2402 in the first auxiliary display region 1020 and the second auxiliary display region 1030, respectively, and display the application screen to which the result of the user interaction through the first keypad 2401 and the second keypad 2402 is applied in the main display region 1010. In this case, the controller 200 may display the first keypad 2401 including the UI elements corresponding to characters having first characteristics in the first auxiliary display region 1020 and display the second keypad 2402 including the UI elements corresponding to characters having second characteristics in the second auxiliary display region 1030. For example, the controller 200 may display the first keypad 2401 including UI elements corresponding to a plurality of consonants, respectively, in the first auxiliary display region 1020 and display the second keypad 2402 including UI elements corresponding to a plurality of vowels, respectively, in the second auxiliary display region 1030.

The consonants may be, for example, 'ㄱ', 'ㄴ', 'ㄷ', 'ㄹ', etc., in the Hangeul and may be 'B', 'C', 'D', 'F', 'G', etc., in the alphabet. Further, the vowels may be, for example, 'ㅏ', 'ㅑ', 'ㅓ', 'ㅕ', etc., in the Hangeul and may be 'A', 'E', 'I', 'O', etc., in the alphabet. Next, the sensor 400 may sense a user interaction for selecting a UI element 2401-1 included in the first keypad 2401 and a UI element 2402-1 included in the second keypad 2402, respectively. For example, the sensor 400 may sense a touch input for touching the UI element 2401-1 included in the first keypad 2401 and the UI element 2402-1 included in the second keypad 2402 together within a predetermined time (for example, 0.3 seconds to 1 second).

Referring to FIG. 24B, the controller 200 may control the display unit 100 to display a text 2405 which is a combined result of the character corresponding to the UI element 2401-1 selected in the first keypad 2401 with the character corresponding to the UI element 2402-1 selected in the second keypad 2402 on the application screen in the main display region 1010. For example, when the character corresponding to the UI element 2401-1 selected in the first keypad 2401 is 'ㄹ' of the consonants of the Hangeul and the character corresponding to the UI element 2402-1 selected in the second keypad 2402 is 'ㅏ' of the vowels of the Hangeul, the controller 200 may control the display unit 100 to display a '라' text which is a combination of two characters on the application screen.

Figures 25A, 25B:
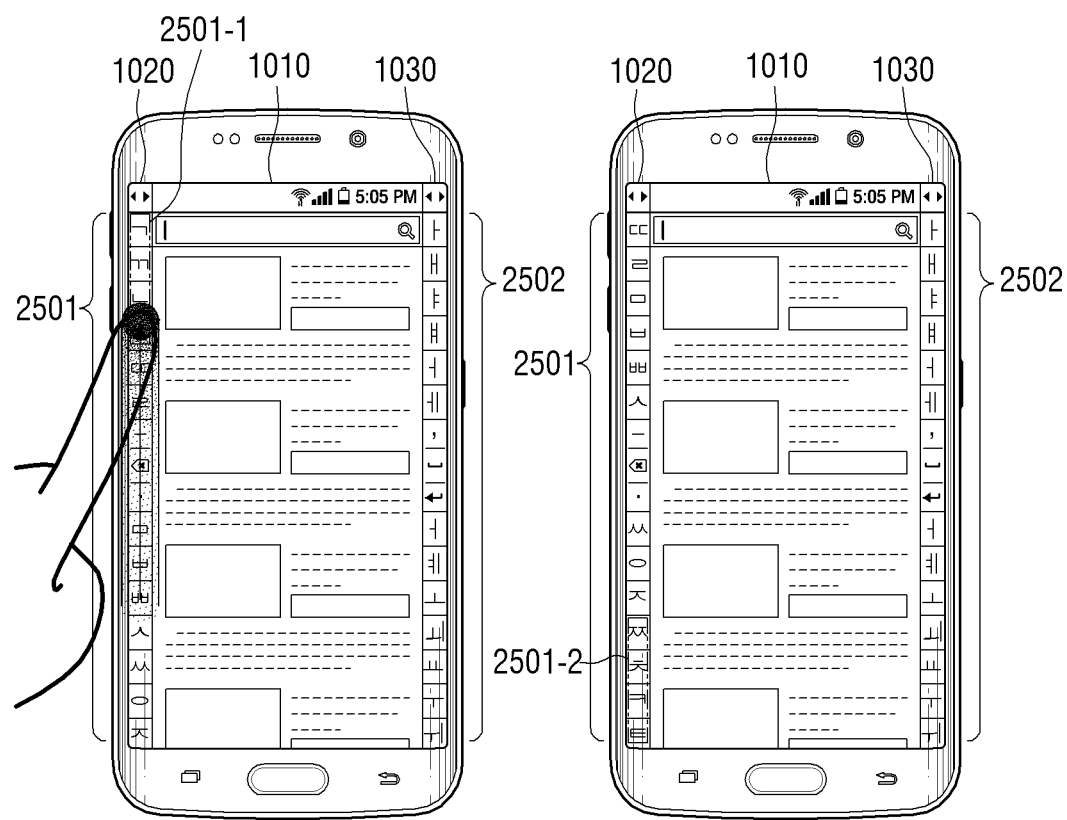

FIGS. 25A and 25B are diagrams illustrating a user interaction displaying a keypad providing other UI elements according to an embodiment of the present disclosure.

Referring to FIG. 25A, the controller 200 may control the display unit 100 to display a first keypad 2501 and a second keypad 2502 in the first auxiliary display region 1020 and the second auxiliary display region 1030, respectively. In this case, the first keypad 2501 may include the UI elements corresponding to the plurality of consonants, respectively and the second key pad 2502 may include the UI elements corresponding to the plurality of vowels, respectively. Next, the sensor 400 may sense the user interaction for displaying the first keypad 2501 included in other UI elements. For example, the sensor 400 may sense the touch input of the user for touching one point on the first auxiliary display region 1020 and then swiping the one point in a vertical direction.

According to the user interaction, as illustrated in FIG. 25B, the controller 200 may control the display unit 100 to remove some UI elements 2501-1 of the UI elements included in the existing first keypad 2501 and display the first keypad 2501 including other UI elements 2501-2. For example, the controller 200 may control the display unit 100 to remove the UI elements corresponding to characters 'ㄱ', 'ㄲ', 'ㄴ', and 'ㄷ' and display UI elements corresponding to characters 'ㅉ', 'ㅊ', 'ㅋ' and 'ㅌ' in the first keypad 2501.

FIGS. 26A to 26C are diagrams illustrating a user interaction for displaying a keypad in consideration of a relation between characters, according to an embodiment of the present disclosure.

According to an embodiment of the present disclosure, the controller 200 may determine characters corresponding to UI elements included in a first keypad 2601 and characters corresponding to UI elements included in a second keypad 2602, in consideration of a character mutual weight which may be a standard of the relation between the characters. The character mutual weight may mean a value associated with a frequency of continuously inputting at least two characters in the character input history. The character input history may also be a pre-stored character input history in which general users are analyzed as a target or the character input history input by the user using the electronic device 1000 for a predetermined period.

FIG. 26A illustrates a frequency table illustrating the frequency of continuously inputting characters in the character input history.

Referring to FIG. 26A, a frequency of a continuous input between the letter 'E' and the letter 'R' from the character input history may have a value of '91493'. The controller 200 may determine at least one second character which is highly likely to be part of a continuous input with the first character using a frequency table.

In this case, the controller 200 may determine a character that is part of a continuous input with the first character and having a frequency more than a preset value as the second character or a predetermined number of characters that are part of a continuous input with the first character and having a relatively higher frequency as the second character, by using the frequency table.

For example, in FIG. 26B, the controller 200 may determine the letter 'E' and the letter 'O' as a character which is highly likely to be continuously input with the letter 'R'. Further, the controller 200 may determine the letter 'A', the letter 'I', and the letter 'O' as a character which is highly likely to be continuously input with the letter 'N'. Next, as illustrated in FIG. 26C, the controller 200 may control the display unit 100 to display the first keypad 2601 including the UI elements corresponding to the first character in the first auxiliary display region 1020 and the second keypad 2602 including the UI elements corresponding to the second character in the second auxiliary display region 1030, based on the relation between the first character and at least one second character which is highly likely to be continuously input with the first character. For example, when characters which are highly likely to be continuously input with the letter 'R' which is a character corresponding to the one UI element 2601-1 included in the first keypad 2601 are the letter 'E' and the letter 'O', the controller 200 may control the display unit 100 to position the UI element 2602-1 corresponding to the letter 'E' and the UI element 2602-2 corresponding to the letter 'O' at a position of the second keypad close to the position of the one UI element 2601-1. In this case, UI elements corresponding to characters which are less likely to be continuously input with the letter 'R' may be disposed at the position of the second keypad remote from the position of the one UI element 2601-1.

As such, the user interaction rate using the electronic device 1000 may be improved by determining the positions of the UI elements of the first keypad 2601 and the second keypad 2602 using the character input history, thereby improving the user satisfaction for the electronic device 1000.

FIGS. 27A to 28B are diagrams illustrating a user interaction of using one hand mode in the auxiliary display region, according to an embodiment of the present disclosure.

The user may also want to use the electronic device 1000 with one hand depending on the user's preference or the user's habit. In this case, the first keypad 2701 may be displayed in the second auxiliary display region 1030 so that the user executes one hand mode to facilitate the user interaction with one hand. When the user executes one hand mode, for example, the user may select the menu button of the electronic device 1000 to execute the one hand mode. Alternatively, the user may execute the one hand mode through the environmental setting application. Alternatively, the user may execute the one hand mode through the quick panel and another user may also execute the one hand mode by various schemes.

Figure 27A:
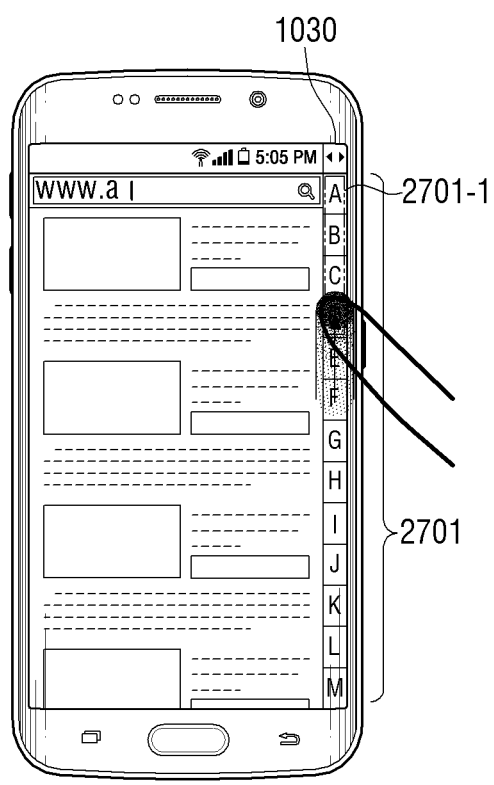

Referring to FIG. 27A, when the one hand mode is executed, the controller 200 may control the display unit 100 to display the first keypad 2701 in the second auxiliary display region 1030. That is, the controller 200 may control the display unit 100 to display the first keypad 2701 in the right second auxiliary display region 1030 of the electronic device 1000, in consideration of the case in which the user grips the electronic device 1000 with his/her right hand. In this case, the first keypad 2701 may include the UI elements each corresponding to the letters 'A' to 'M'. Next, the sensor 400 may sense the user interaction for moving the positions of UI elements included in the first keypad 2701. For example, the sensor 400 may sense the touch input of the user for touching one point on the secondary auxiliary display region 1030 and then swiping the one point in a vertical direction.

Figure 27B:
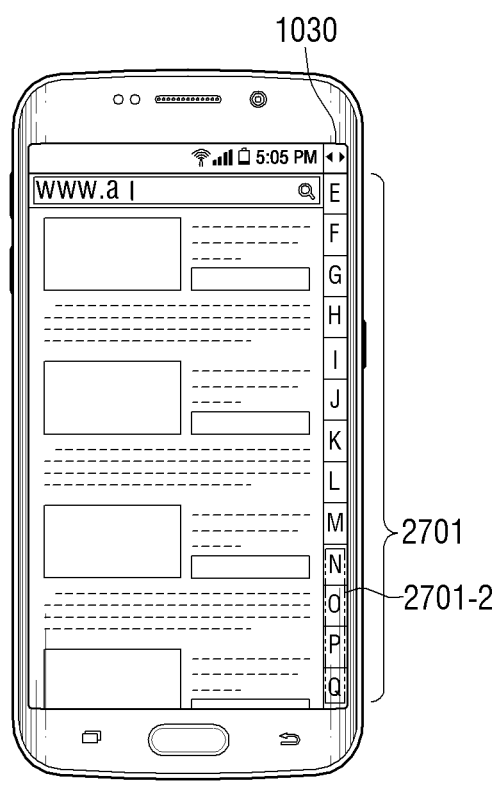

According to the user interaction, as illustrated in FIG. 27B, the controller 200 may control the display unit 100 to remove some UI elements 2701-1 of the UI elements included in the existing first keypad 2701 and display the first keypad 2701 including other UI elements 2701-2 in the second auxiliary display region. For example, the controller 200 may control the display unit 100 to remove the UI elements 2701-1 corresponding to the letters "A', 'B', 'C', and 'D' and display the UI elements 2701-2 corresponding to the letters 'N', 'O', 'P', and 'Q' in the first keypad 2701.

As such, other UI elements are displayed depending on the user interaction without being limited to the size of the first keypad displayed in the second auxiliary display region 1030, thereby improving the user convenience manipulating the electronic device 1000 with one hand.

Figures 28A, 28B:
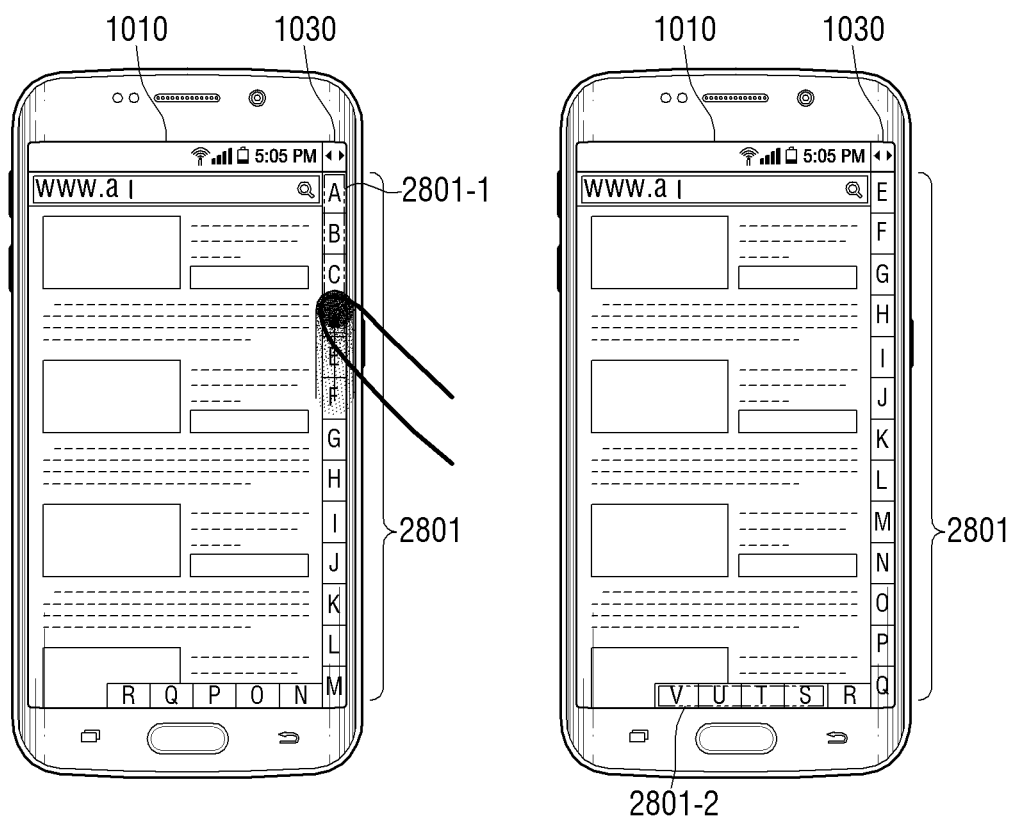

Referring to FIG. 28A, when the one hand mode is executed, the controller 200 may control the display unit 100 to display the first keypad 2801 in the second auxiliary display region 1030 and the side surface of the main display region 1010. That is, the controller 200 may control the display unit 100 to display the first keypad 2801 in the second auxiliary display region 1030 and a portion of the lower portion of the main display region 1010, in consideration of the case in which the user grips the electronic device 1000 with his/her right hand. In this case, the first keypad 2801 may include the UI elements each corresponding to the letters 'A' to R'. Next, the sensor 400 may sense the user interaction for moving the positions of UI elements included in the first keypad 2801. For example, the sensor 400 may sense the touch input of the user for touching one point on the secondary auxiliary display region 1030 and then swiping the one point in a vertical direction.

Referring to FIG. 28B, the controller 200 may control the display unit 100 to remove some UI elements 2801-1 of the UI elements included in the existing first keypad 2801 and display the first keypad 2802 including other UI elements 2801-2 in the second auxiliary display region 1030. For example, the controller 200 may control the display unit 100 to remove the UI elements 2801-1 corresponding to the letters 'A', B', 'C', and 'D' and display the UI elements 2801-2 corresponding to the letters '5', 'T', 'U', and 'V' in the first keypad 2801.

Meanwhile, in FIGS. 28A and 28B, the case in which the first keypad 2801 is continuously displayed in the second auxiliary display region 1030 and the main display region 1010 is described, but the first keypad 2801 may be separately displayed in the second auxiliary display region 1030 and the main display region 1010, respectively, as the second keypad and the third keypad, depending on the implementation scheme. In this case, the second keypad and the third keypad may be displayed to be separated from each other or may also be displayed to be connected to each other.

FIGS. 29A to 30B are diagrams illustrating a user interaction result using a keypad in a main display region, according to an embodiment of the present disclosure.

Figures 29A, 29B:
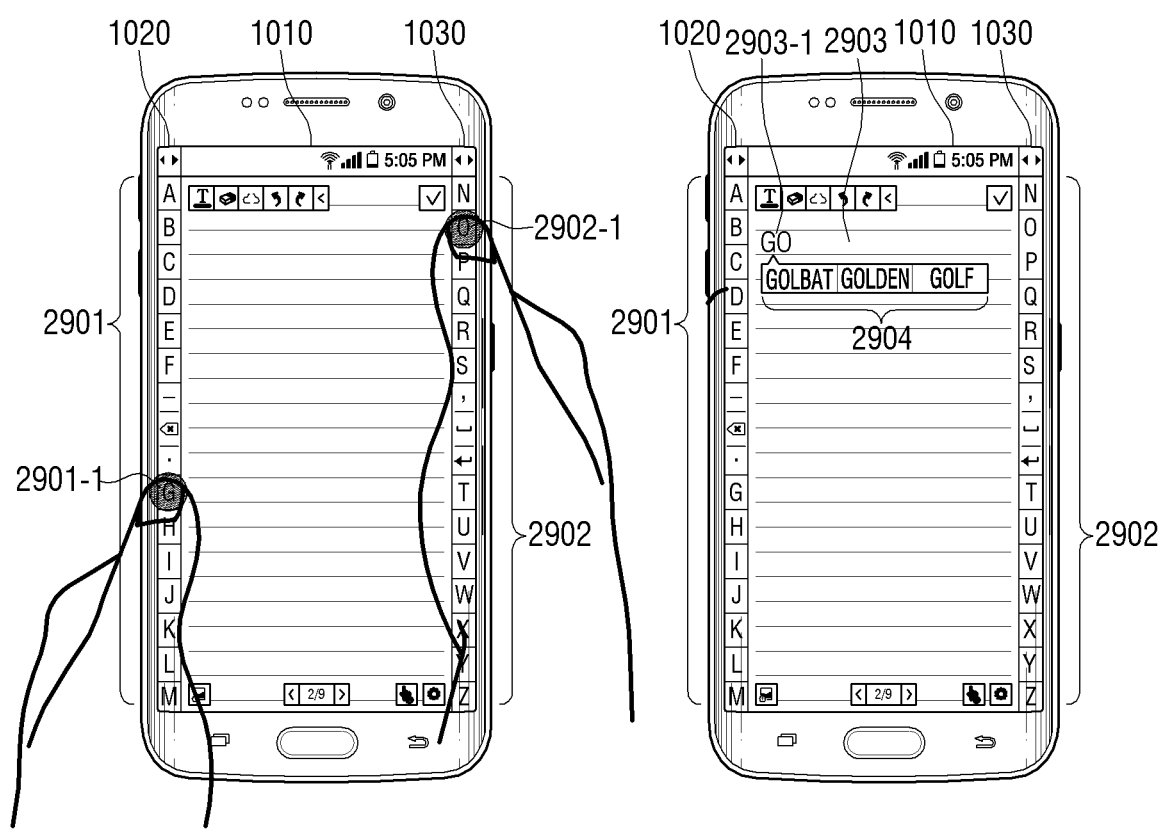

Referring to FIG. 29A, the controller 200 may control the display unit 100 to display a first keypad 2901 and a second keypad 2902 in the first auxiliary display region 1020 and the second auxiliary display region 1030, respectively. Further, the controller 200 may control the display unit 100 to display the memo application screen to which the result of the user interaction through the first keypad 2901 and the second keypad 2902 may be applied in the main display region 1010. In this case, the sensor 400 may sense a user interaction for selecting a UI element 2901-1 included in the first keypad 2901 and a UI element 2902-1 included in the second keypad 2902, respectively. For example, the sensor 400 may sense a touch input for touching the UI element 2901-1 included in the first keypad 2901 and the UI element 2901-2 included in the second keypad 2902.

Referring to FIG. 29B, the controller 200 may control the display unit 100 to display a text 2903-1 corresponding to the selected UI elements 2901-1 and 2901-2 in a character input field 2903 included in the main display region 1010. In this case, accommodation words associated with the displayed text may be displayed near the text 2903-1 displayed in the character input field 2903, along with a list 2904.

Figures 30A, 30B:
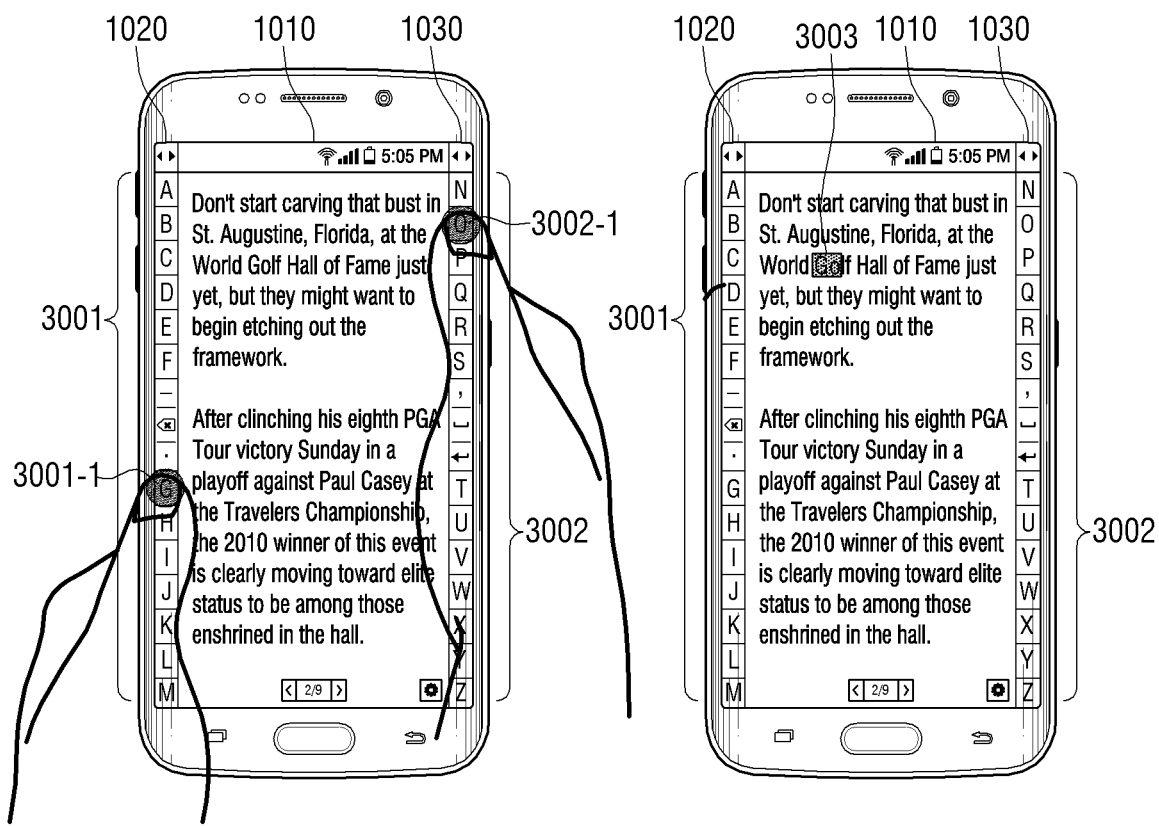

Referring to FIG. 30A, the controller 200 may control the display unit 100 to display a first keypad 3001 and a second keypad 3002 in the first auxiliary display region 1020 and the second auxiliary display region 1030, respectively. Further, the controller 200 may control the display unit 100 to display the e-book application screen to which the result of the user interaction through the first keypad 3001 and the second keypad 3002 may be applied in the main display region 1010. In this case, the sensor 400 may sense a user interaction for selecting a UI element 3001-1 included in the first keypad 3001 and a UI element 3002-1 included in the second keypad 3002, respectively. For example, the sensor 400 may sense a touch input for touching the UI element 3001-1 included in the first keypad 3001 and the UI element 3002-1 included in the second keypad 3002.

According to the user interaction, as illustrated in FIG. 30B, the controller 200 may control the display unit 100 to display at least some 3003 of the words including characters corresponding to the selected UI elements 3001-1 and 3002-1 among words included in the main display region 1010 while at least some 3003 is highlighted. That is, the controller 200 may control the display unit 100 to search for words including characters corresponding to the selected UI elements 3001-1 and 3002-1 among the words included in the e-book application in the main display region 1010 and display at least some of the searched words while being highlighted.

FIGS. 31 to 35 are flowcharts for describing a user interaction using a keypad displayed in an auxiliary display region according to an embodiment of the present disclosure.

Figure 31:
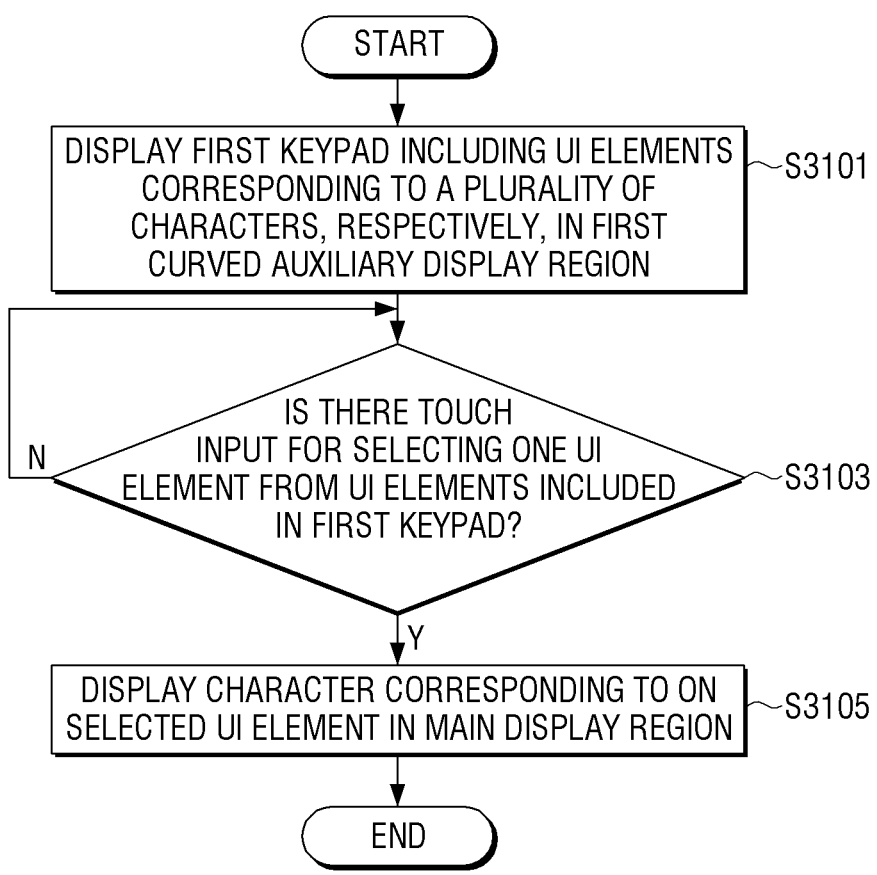

Referring to FIG. 31, the electronic device 1000 may display the first keypad including the UI elements corresponding to the plurality of characters, respectively, in a first curved auxiliary display region in operation 53101. In this case, the electronic device 1000 may display the application screen including the character input field in the main display region.

In operation S3103, the electronic device 1000 may determine whether the touch input for selecting one UI element from the UI elements included in the first keypad is sensed.

If the touch input is sensed (S3103-Y), in operation 53105, the electronic device 1000 may display the character corresponding to the selected one UI element in the main display region. For example, the electronic device 1000 may display the character corresponding to the selected one UI element in the character input field of the application screen which is being displayed in the main display region.

Figure 32:
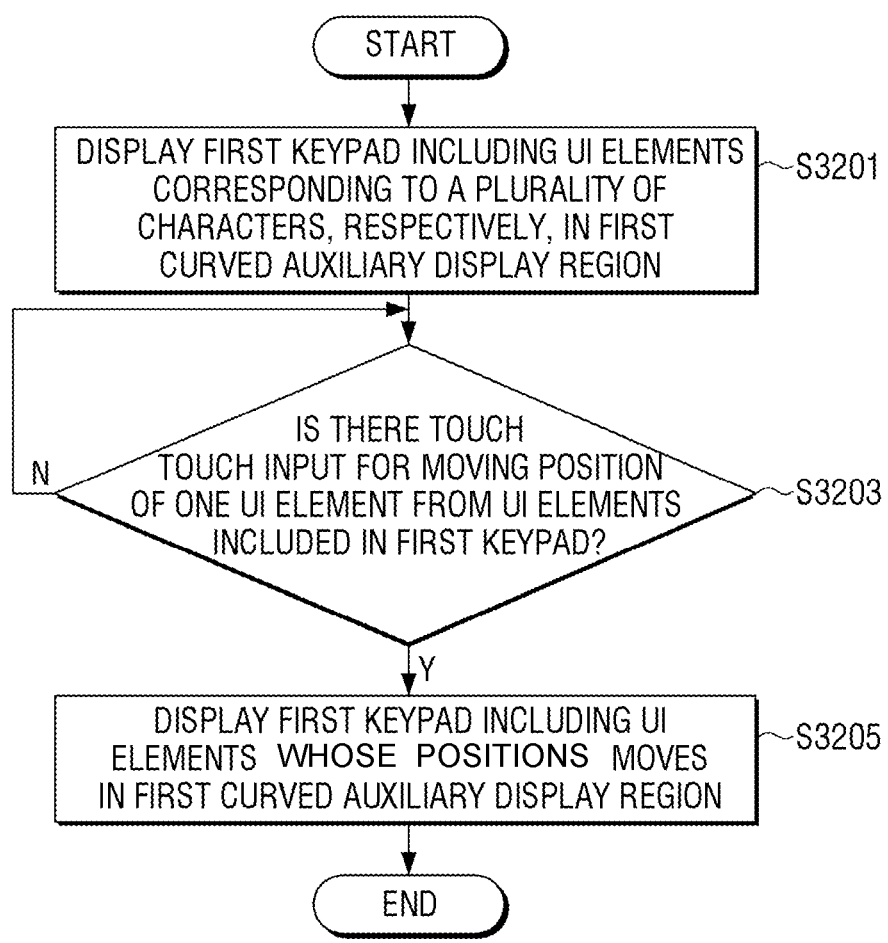

Referring to FIG. 32, the electronic device 1000 may display the first keypad including the UI elements corresponding to the plurality of characters, respectively, in a first curved auxiliary display region in operation 53201.

In operation S3203, the electronic device 1000 may determine whether the touch input for moving the position of one UI element from the UI elements included in the first keypad is sensed.

If the touch input is sensed (S3203-Y), in operation 53205, the electronic device 1000 may display the first keypad including one UI element whose position moves in the first curved auxiliary display region.

Figure 33:
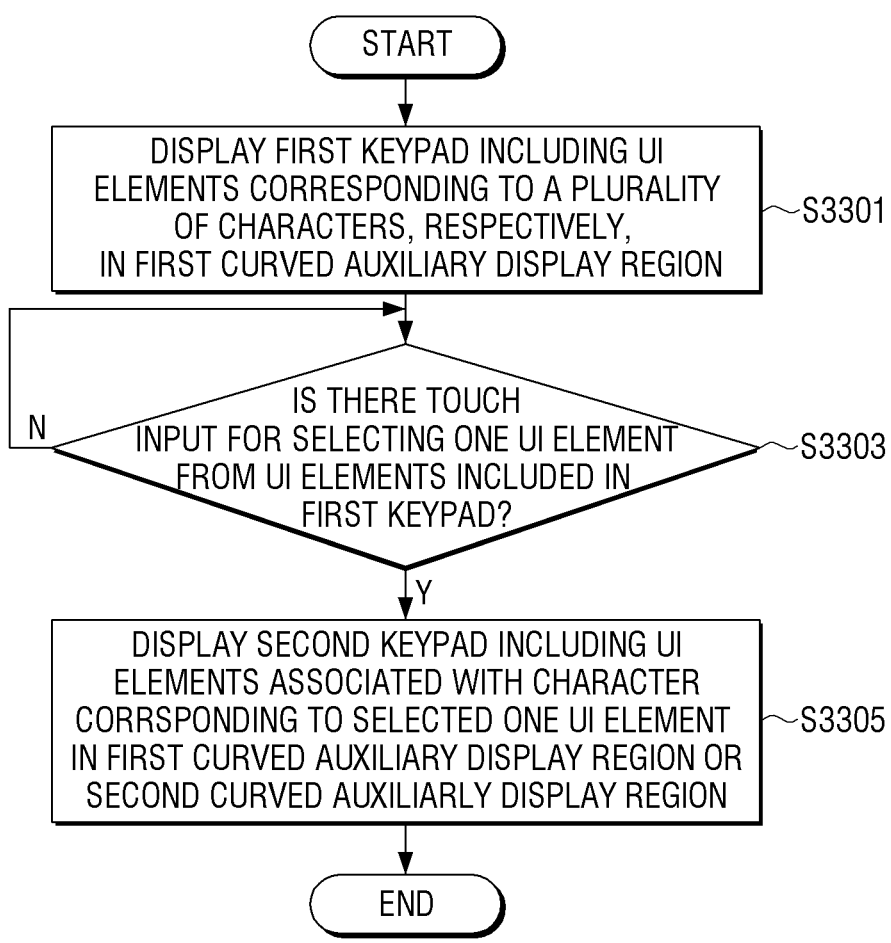

Referring to FIG. 33, the electronic device 1000 may display the first keypad including the UI elements corresponding to the plurality of characters, respectively, in a first curved auxiliary display region in operation 53301.

In operation S3303, the electronic device 1000 may determine whether the touch input for selecting one UI element from the UI elements included in the first keypad is sensed.

If the touch input is sensed (S3303-Y), in operation 53305, the electronic device 1000 may display the second keypad including the UI elements associated with the character corresponding to the selected one UI element in the first curved auxiliary display region or the second curved auxiliary display region. For example, when the selected one UI element is a specific letter, the UI elements associated with a specific letter may be the UI elements corresponding to words including the specific letter. Alternatively, when the selected one UI element is the specific letter, the UI elements associated with the specific letter may be the UI elements corresponding to characters belonging to a subgroup of the specific letter. Alternatively, when the selected one UI element is the specific letter, the UI elements associated with the specific letter may be the UI elements corresponding to a Chinese character or a candidate Chinese character having the specific letter as a pinyin.

Figure 34:
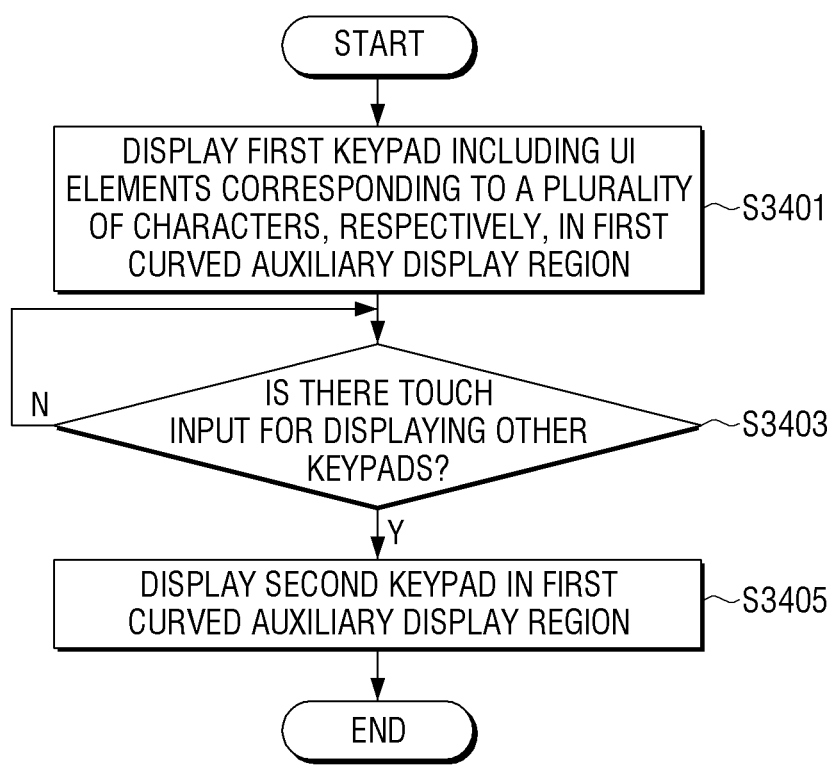

Referring to FIG. 34, the electronic device 1000 may display the first keypad including the UI elements corresponding to the plurality of characters, respectively, in a first curved auxiliary display region in operation 53401.

In operation S3403, the electronic device 1000 may determine whether a touch input for displaying other keypads is sensed.

If the touch input is sensed (S3403-Y), in operation 53405, the electronic device 1000 may display the second keypad in the first curved auxiliary display region. For example, the first keypad is a keypad including the UI elements corresponding to the capital letters, the second keypad may be a keypad including the UI elements corresponding to the lower case letters. Alternatively, the second keypad may be a keypad including the UI elements corresponding to the special characters.

Figure 35:
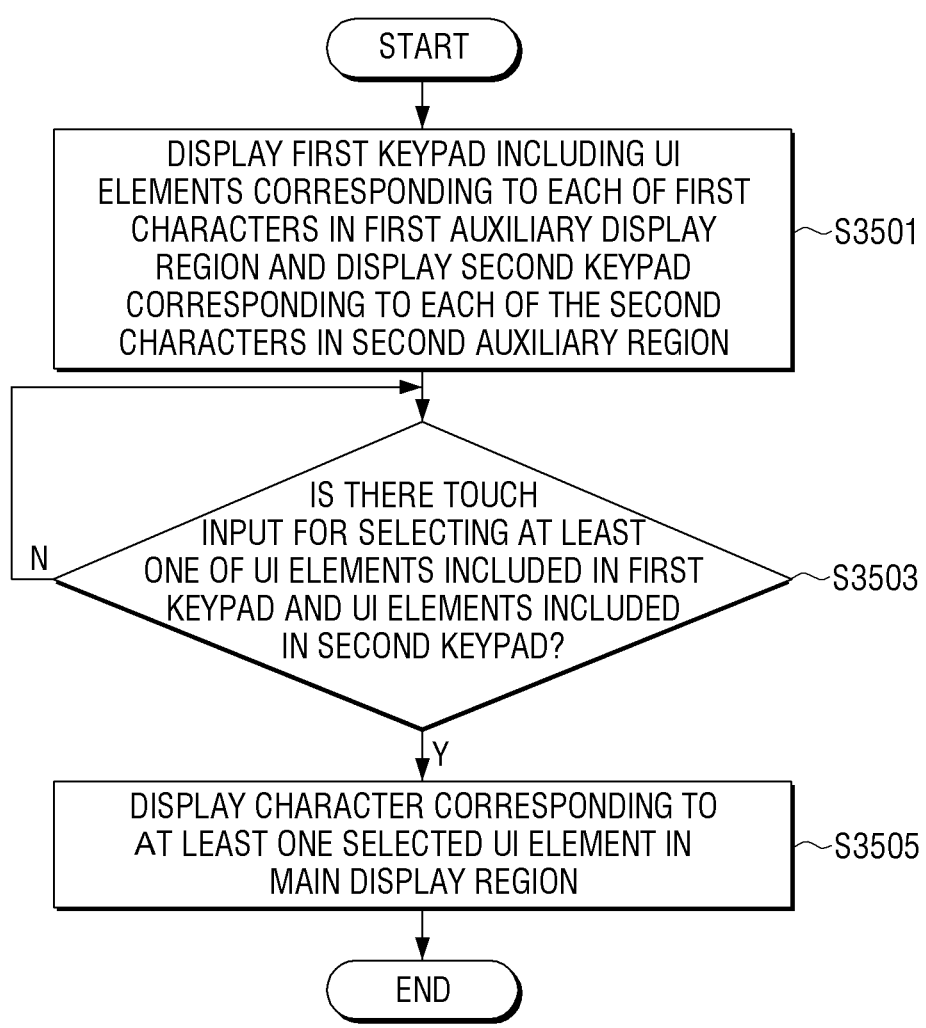

Referring to FIG. 35, the electronic device 1000 may display the first keypad including the UI elements corresponding to each of the first characters in the first auxiliary display region and display the second keypad corresponding to each of the second characters in the second auxiliary region in operation 53501.

In operation S3503, the electronic device 1000 may determine whether the touch input for selecting at least one of the UI elements included in the first keypad and the UI elements included in the second keypad is sensed.

If the touch input is sensed (S3503-Y), in operation S3505, the electronic device 1000 may display the character corresponding to the selected at least one UI element in the main display region. For example, the electronic device 1000 may be a combination of the character corresponding to the UI element selected from the UI elements included in the first keypad and the character corresponding to the UI element included in the second keypad and may display the combination in the main display region. Meanwhile, the keypad displaying method of an electronic device according to the foregoing various embodiments of the present disclosure may be implemented as programs. Particularly, the program including the keypad displaying method of an electronic device may be stored and provided in a non-transitory computer readable medium.

The non-transitory computer readable medium is not a medium that stores data therein for a while, such as a register, a cache, a memory, or the like, but means a medium that semi-permanently stores data therein and is readable by a device. In more detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Further, it may be understood that each block of flow charts and combinations of flow charts may be performed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in block(s) of the flow chart. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in the block(s) of the flow chart. Since the computer program instructions may also be mounted on the computer or the other programmable data processing apparatuses, the instructions performing a series of operation steps on the computer or the other programmable data processing apparatuses to create processes executed by the computer, thereby executing the computer or the other programmable data processing apparatuses may also provide operations for performing the functions described in block(s) of the flow chart. In addition, each block may indicate some of modules, segments, or codes including one or more executable instructions for executing a specified logical function(s). Further, it is to be noted that functions mentioned in the blocks occur regardless of a sequence in some alternative embodiments of the present disclosure. For example, two blocks that are continuously shown may be simultaneously performed in fact or be performed in a reverse sequence depending on corresponding functions.

While the present disclosure has been shown and described with reference to various embodiments thereof, it will be understood by those skilled in the art that various changes in form and details may be made therein without departing from the scope and spirit of the present disclosure as defined by the appended claims and their equivalents.

What is claimed is:

1. A method for displaying information by an electronic device including a touch screen including a main display region and a first auxiliary display region curved toward a first side of the main display region while integrally extending from the main display region and having a size smaller than that of the main display region and a second auxiliary display region curved toward a second side of the main display region while integrally extending from the main display region and having a size smaller than that of the main display region, the display method comprising:

displaying a character input field in the main display region;

displaying a first keypad including user interaction (UI) elements corresponding to a plurality of characters, respectively, in the first auxiliary display region;

displaying a second keypad including UI elements corresponding to a plurality of characters, respectively, in the second auxiliary display region; and based on a touch input being sensed for selecting one UI element from the UI elements included in the first keypad, displaying the character corresponding to the selected one UI element in the character input field, wherein at least one UI element included in the second keypad corresponds to a character associated with a character corresponding to the UI element selected from the UI elements of the first keypad, wherein a position of the at least one UI element included in the second keypad is determined based on a position of the selected UI element among the UI elements of the first keypad and character mutual weight between the selected UI element in the first keypad and the at least one UI element in the second keypad, and wherein the character mutual weight comprises a value associated with a frequency of continuously inputting at least two characters in a character input history.

2. The method of claim 1, wherein the UI elements included in the first keypad are arranged in a vertical direction of the electronic device according to a predetermined sequence.

3. The method of claim 1, wherein the first keypad further includes a UI element for indicating a position at which the character is displayed or deleting a pre-written character.

4. The method of claim 1,
wherein the characters corresponding to the UI elements included in the first keypad and the characters corresponding to the UI elements included in the second keypad are different from each other.

5. The method of claim 1, further comprising:
when a second touch input for controlling a size of the UI elements included in the first keypad is sensed, displaying the first keypad including the UI elements whose sizes are controlled in the first curved auxiliary display region.

6. The method of claim 1, further comprising:
when a second touch input for moving a position of the UI elements included in the first keypad is sensed, displaying the first keypad including the UI elements whose positions move in the first curved auxiliary display region.

7. The method of claim 1, further comprising:
when a second touch input for displaying another keypad is sensed, displaying a third keypad in the first auxiliary display region,
wherein the characters corresponding to the UI elements included in the first keypad and characters corresponding to the UI elements included in the third keypad are different from each other.

8. The method of claim 1, further comprising:
when the touch input for selecting the one UI element from the UI elements included in the first keypad is sensed, displaying the second keypad including UI elements corresponding to other characters associated with the character corresponding to the selected one UI element in the second auxiliary display region.

9. The method of claim 1, further comprising:
when a second touch input for displaying other UI elements in the first keypad is sensed, removing at least some of the UI elements included in the first keypad and displaying other UI elements while being included in the first keypad.

10. An electronic device including a touch screen including a main display region and a first auxiliary display region curved toward a first side of the main display region while integrally extending from the main display region and having a size smaller than that of the main display region and a second auxiliary display region curved toward a second side of the main display region while integrally extending from the main display region and having a size smaller than that of the main display region, the electronic device comprising:

the touch screen configured to:
display a character input field in the main display region,
display a first keypad including user interaction (UI) elements corresponding to a plurality of characters, respectively, in the first auxiliary display region, and
display a second keypad including UI elements corresponding to a plurality of characters, respectively, in the second auxiliary display region;

a sensor configured to sense a first touch input for selecting one UI element from UI elements included in the first keypad; and a processor configured to, based on a touch input being sensed by the sensor for selecting one UI element from the UI elements included in the first keypad, control the touch screen to display a character corresponding to the selected one UI element in the character input field, wherein at least one UI element included in the second keypad corresponds to a character associated with a character corresponding to the UI element selected from the UI elements of the first keypad, wherein a position of the at least one UI element included in the second keypad is determined based on a position of the selected UI element among the UI elements of the first keypad and character mutual weight between the selected UI element in the first keypad and the at least one UI element in the second keypad, and wherein the character mutual weight comprises a value associated with a frequency of continuously inputting at least two characters in a character input history.

11. The electronic device of claim 10, wherein the UI elements included in the first keypad are arranged in a vertical direction of the electronic device according to a predetermined sequence.

12. The electronic device of claim 10, wherein the first keypad further includes a UI element for indicating a position at which a character is displayed or deleting a pre-written character.

13. The electronic device of claim 10,
wherein the characters corresponding to the UI elements included in the first keypad and the characters corresponding to the UI elements included in the second keypad are different from each other.

14. The electronic device of claim 10,
wherein the sensor is further configured to sense a second touch input for controlling a size of the UI elements included in the first keypad, and
wherein the processor is further configured to control the touch screen so that the first keypad including the UI elements whose sizes are controlled is displayed in the first curved auxiliary display region, depending on the second touch input sensed by the sensor.

15. The electronic device of claim 10,
wherein the sensor is further configured to sense a second touch input for moving a position of the UI elements included in the first keypad, and
wherein the processor is further configured to control the touch screen so that the first keypad including the UI elements whose positions move is displayed in the first curved auxiliary display region, depending on the second touch input sensed by the sensor.

16. The electronic device of claim 10,
wherein the sensor is further configured to sense a second touch input for displaying another keypad, wherein the processor is further configured to control the touch screen so that a third keypad is displayed in the first auxiliary display region, depending on the second touch input sensed by the sensor, and wherein the characters corresponding to the UI elements included in the first keypad and characters corresponding to UI elements included in the third keypad are different from each other.

17. The electronic device of claim 10, wherein the processor is further configured to control the touch screen so that the second keypad including UI elements corresponding to other characters associated with the character corresponding to the selected one UI element is displayed in the second curved auxiliary display region, depending on the touch input sensed by the sensor for selecting the one UI e lenient from the UI elements included in the first keypad.

18. The electronic device of claim 10, wherein the sensor is further configured to sense a second touch input for displaying other UI elements in the first keypad, and wherein the processor is further configured to control the touch screen so that at least some of the UI elements included in the first keypad are removed and other UI elements are displayed while being included in the first keypad, depending on the second touch input sensed by the sensor.

* * * * *